US012671999B2

(12) United States Patent
Boucadair et al.

(10) Patent No.: US 12,671,999 B2
(45) Date of Patent: Jun. 30, 2026

(54) PROCESS FOR SEARCHING FOR SENSITIVE DATA IN AT LEAST ONE DATA PACKET, ASSOCIATED DEVICE AND SYSTEM

(71) Applicant: ORANGE, Issy les Moulineaux (FR)

(72) Inventors: Mohamed Boucadair, Chatillon (FR); Christian Jacquenet, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 44 days.

(21) Appl. No.: 18/708,806

(22) PCT Filed: Nov. 8, 2022

(86) PCT No.: PCT/EP2022/081046

§ 371 (c)(1),
(2) Date: Jul. 12, 2024

(87) PCT Pub. No.: WO2023/083770

PCT Pub. Date: May 19, 2023

(65) Prior Publication Data

US 2024/0422552 A1        Dec. 19, 2024

(30) Foreign Application Priority Data

Nov. 10, 2021    (FR) ...................................... 2111977

(51) Int. Cl.
| | |
|---|---|
| *H04L 29/06* | (2006.01) |
| *G06F 21/00* | (2013.01) |
| *H04W 12/088* | (2021.01) |
| *H04W 12/67* | (2021.01) |

(52) U.S. Cl.
CPC ......... *H04W 12/67* (2021.01); *H04W 12/088* (2021.01)

(58) Field of Classification Search
None
See application file for complete search history.

(56) References Cited

U.S. PATENT DOCUMENTS

| | | | | |
|---|---|---|---|---|
| 8,856,869 | B1 * | 10/2014 | Brinskelle | ........... H04L 63/0823 |
| | | | | 726/2 |
| 10,277,629 | B1 * | 4/2019 | Guntur | .................. G06F 16/285 |

(Continued)

OTHER PUBLICATIONS

International Search Report dated Jan. 23, 2023 for corresponding International Application No. PCT/EP2022/081046, filed Nov. 8, 2022.

(Continued)

*Primary Examiner* — Lisa C Lewis
(74) *Attorney, Agent, or Firm* — David D. Brush; Westman, Champlin & Koehler, P.A.

(57) ABSTRACT

A method for identifying sensitive data in at least one data packet emitted by at least one terminal connected to a network, items of identification information relating to an identity and/or environment of an entity to which the at least one terminal belongs being able to be determined from sensitive data having been inserted into the at least one packet before it reaches a destination equipment item. The method includes steps implemented by a searching device, including: receiving the at least one data packet, searching for sensitive data in the at least one data packet, and, where applicable, providing the entity with items of information about the detected sensitive data.

14 Claims, 5 Drawing Sheets

(56)          References Cited

U.S. PATENT DOCUMENTS

| 2016/0191545 | A1* | 6/2016 | Nanda | H04L 43/20 |
| | | | | 726/1 |
| 2016/0191945 | A1* | 6/2016 | Gurbuz | H04N 19/527 |
| | | | | 375/240.15 |
| 2016/0255538 | A1* | 9/2016 | Savarimuthu | H04L 67/10 |
| | | | | 370/329 |
| 2023/0229763 | A1* | 7/2023 | Radhakrishnan | G06N 3/045 |
| | | | | 726/22 |
| 2023/0283621 | A1* | 9/2023 | Techentin | G06F 21/55 |
| | | | | 726/23 |

OTHER PUBLICATIONS

Written Opinion of the International Searching Authority dated Jan. 23, 2023 for corresponding International Application No. PCT/EP2022/081046, filed Nov. 8, 2022.

Anastasia Shuba et al., "AntShield: On-Device Detection of Personal Information Exposure", arxiv.org, Cornell University Library, 201 Olin Library Cornell University Ithaca, NY 14853, Mar. 4, 2018 (Mar. 4, 2018), XP080857567.

Evita Bakopoulou et al., "Exposures Exposed: A Measurement and User Study to Assess Mobile Data Privacy in Context," arxiv.org, Cornell University Library, 201 Olin Library Cornell University Ithaca, NY 14853, Aug. 19, 2020 (Aug. 19, 2020), XP081744919.

French Search Report and Written Opinion dated Jun. 3, 2022 for corresponding French Application No. 2111977, filed Nov. 10, 2021.

English translation of the Written Opinion of the International Searching Authority dated Jan. 23, 2023 for corresponding International Application No. PCT/EP2022/081046, filed Nov. 8, 2022.

A. Cooper et al, "Privacy Considerations for Internet Protocols," Internet Architecture Board (IAB), Request for Comments 6973, ISSN: 2070-1721, Jul. 2013, 36 pages.

* cited by examiner

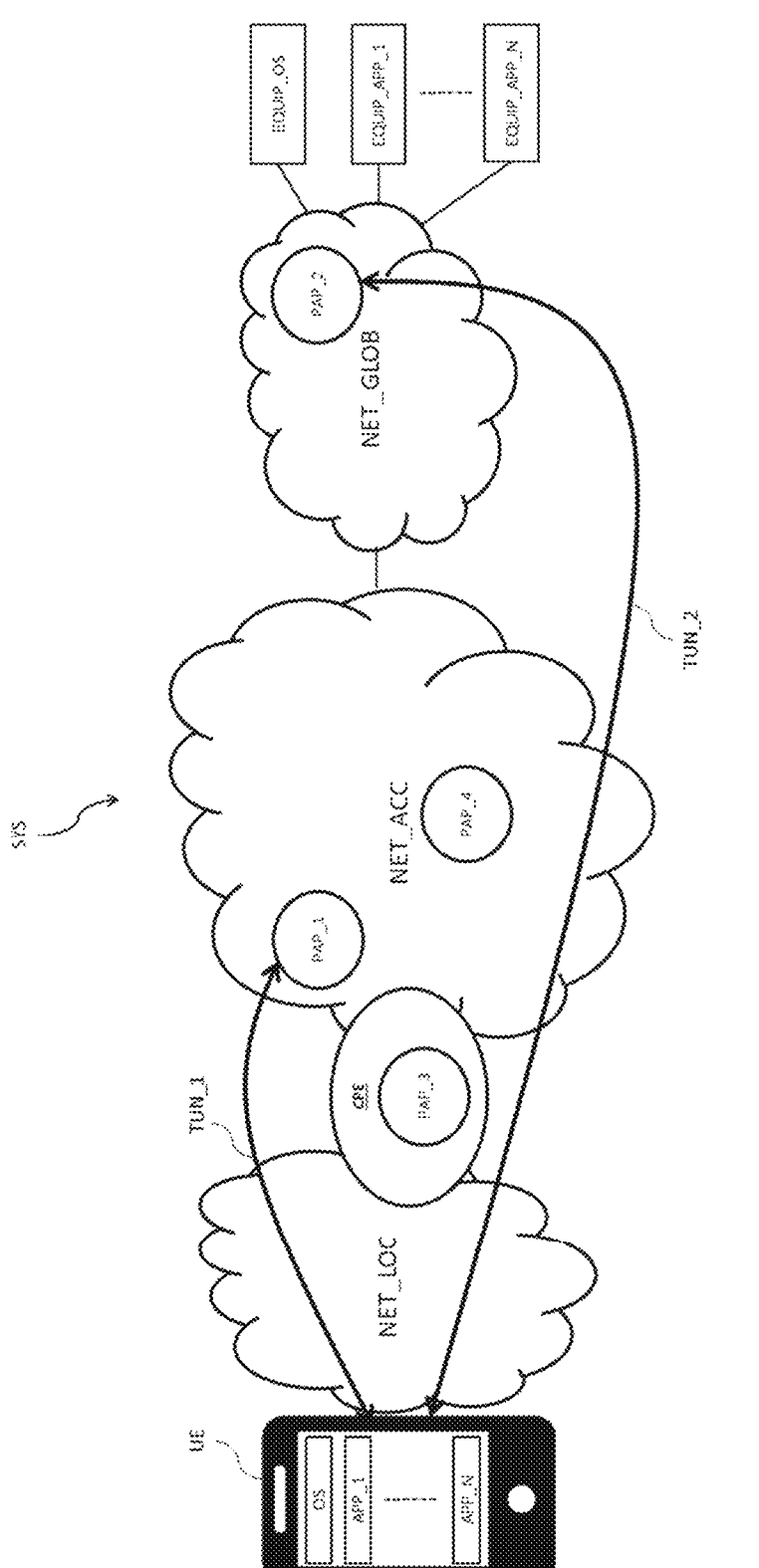
[Fig. 1]

[Fig. 2]
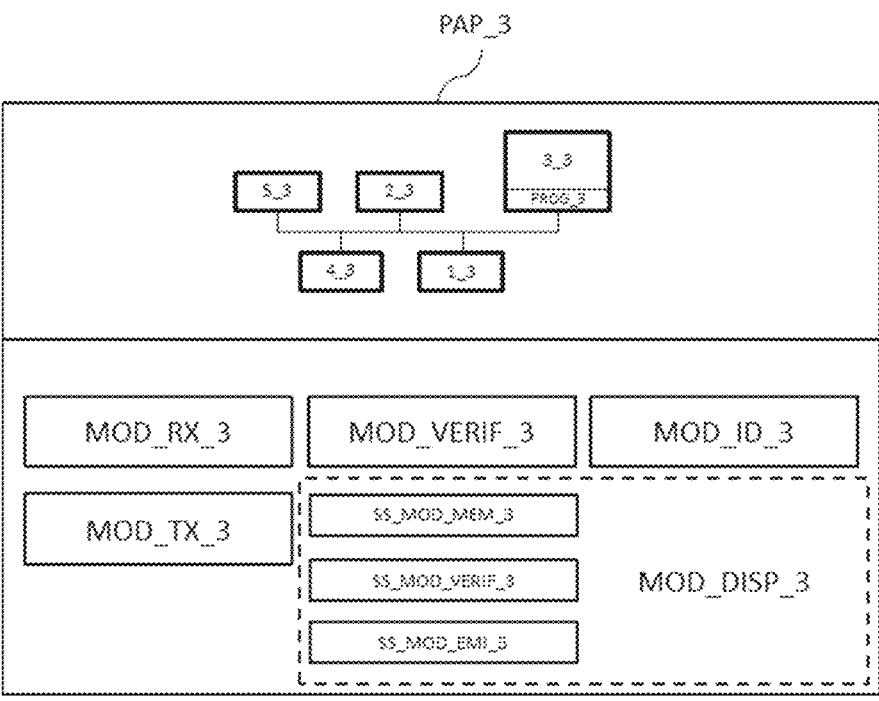
[Fig. 3]
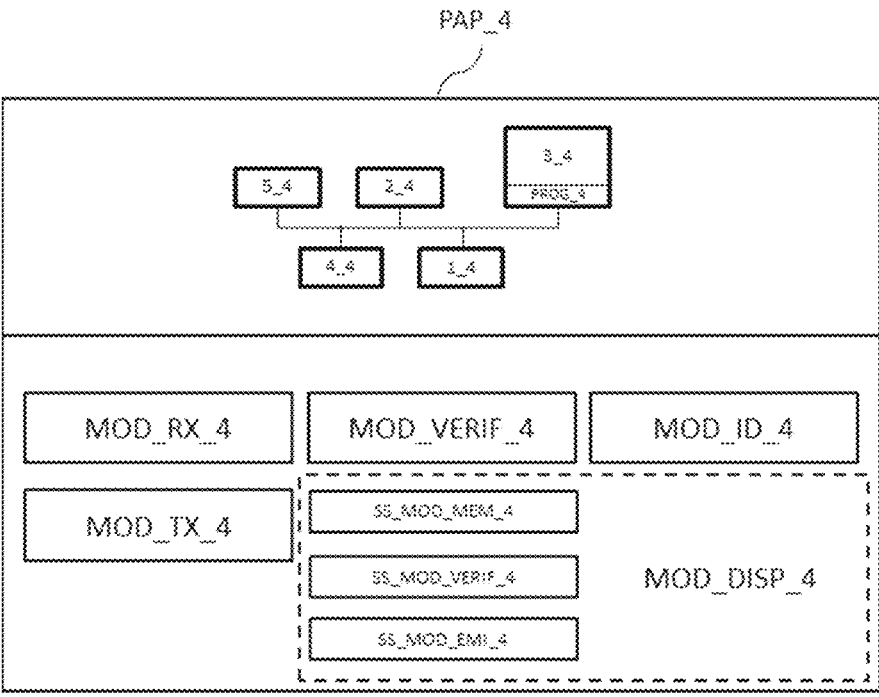

[Fig. 4]
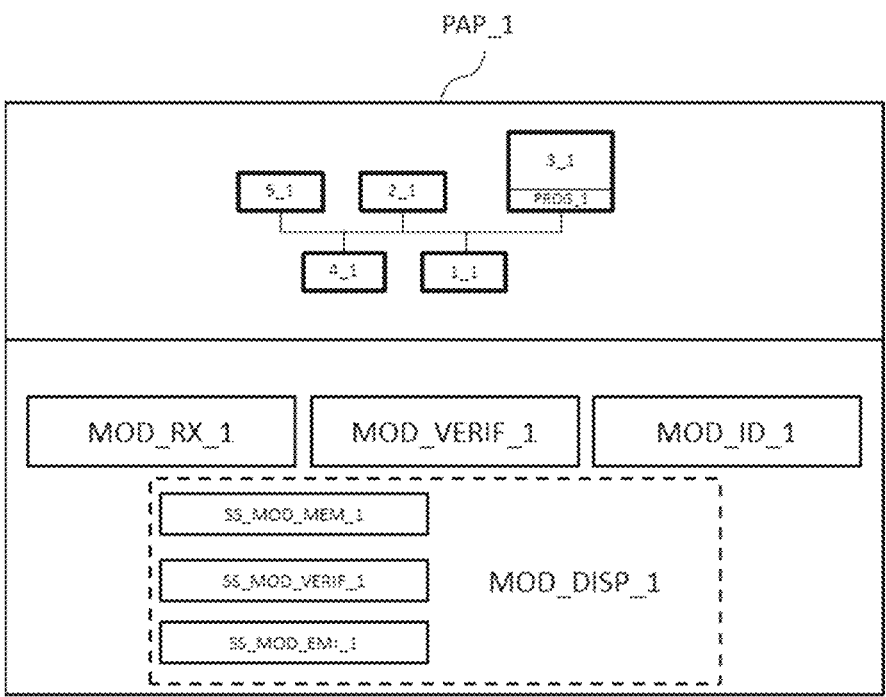
[Fig. 5]
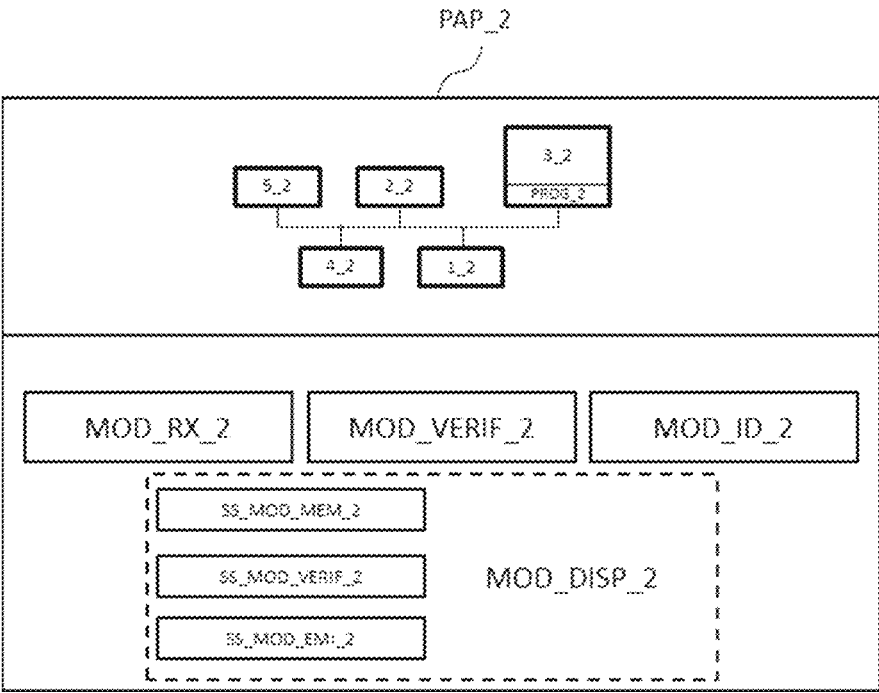

[Fig. 6]
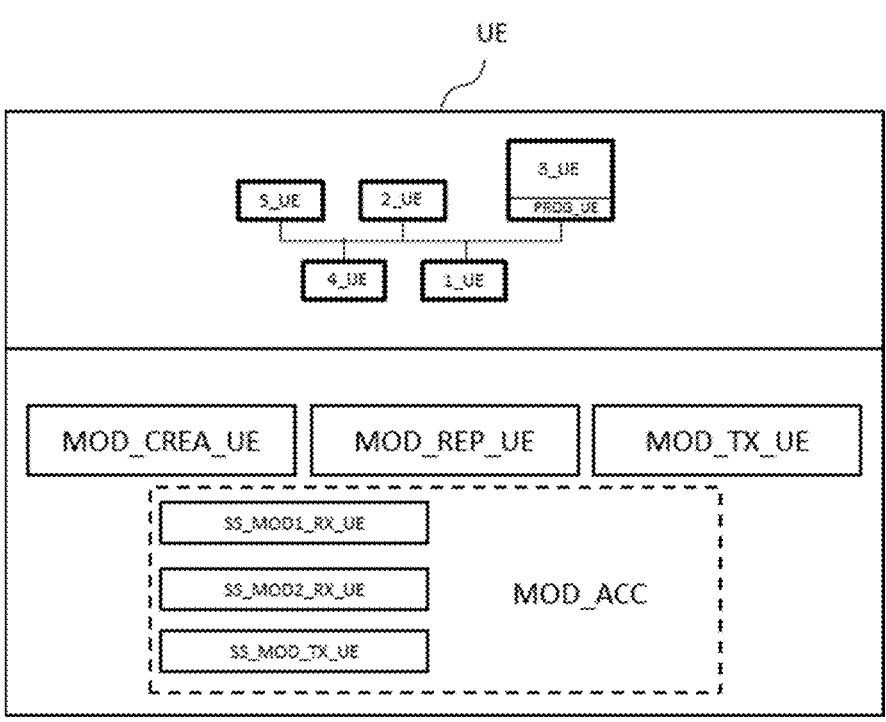
[Fig. 8]
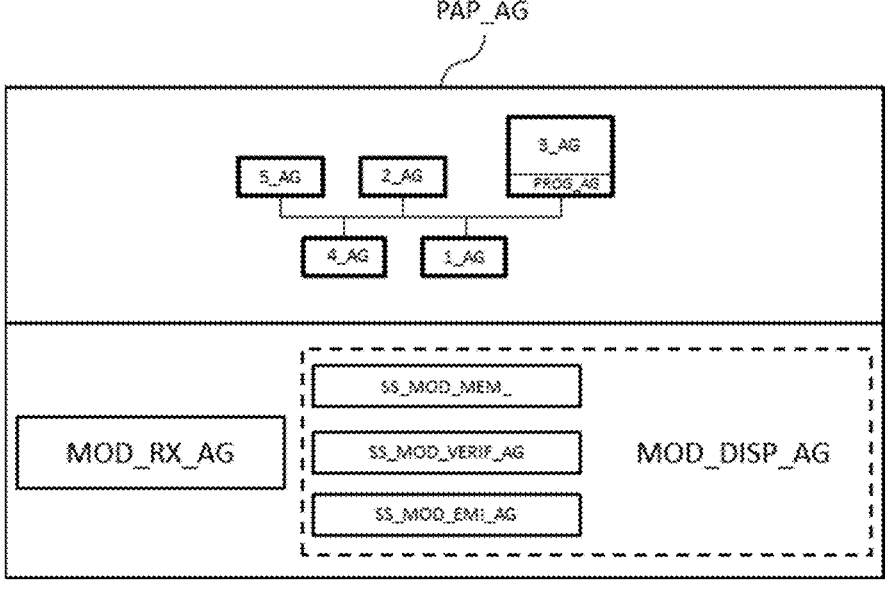

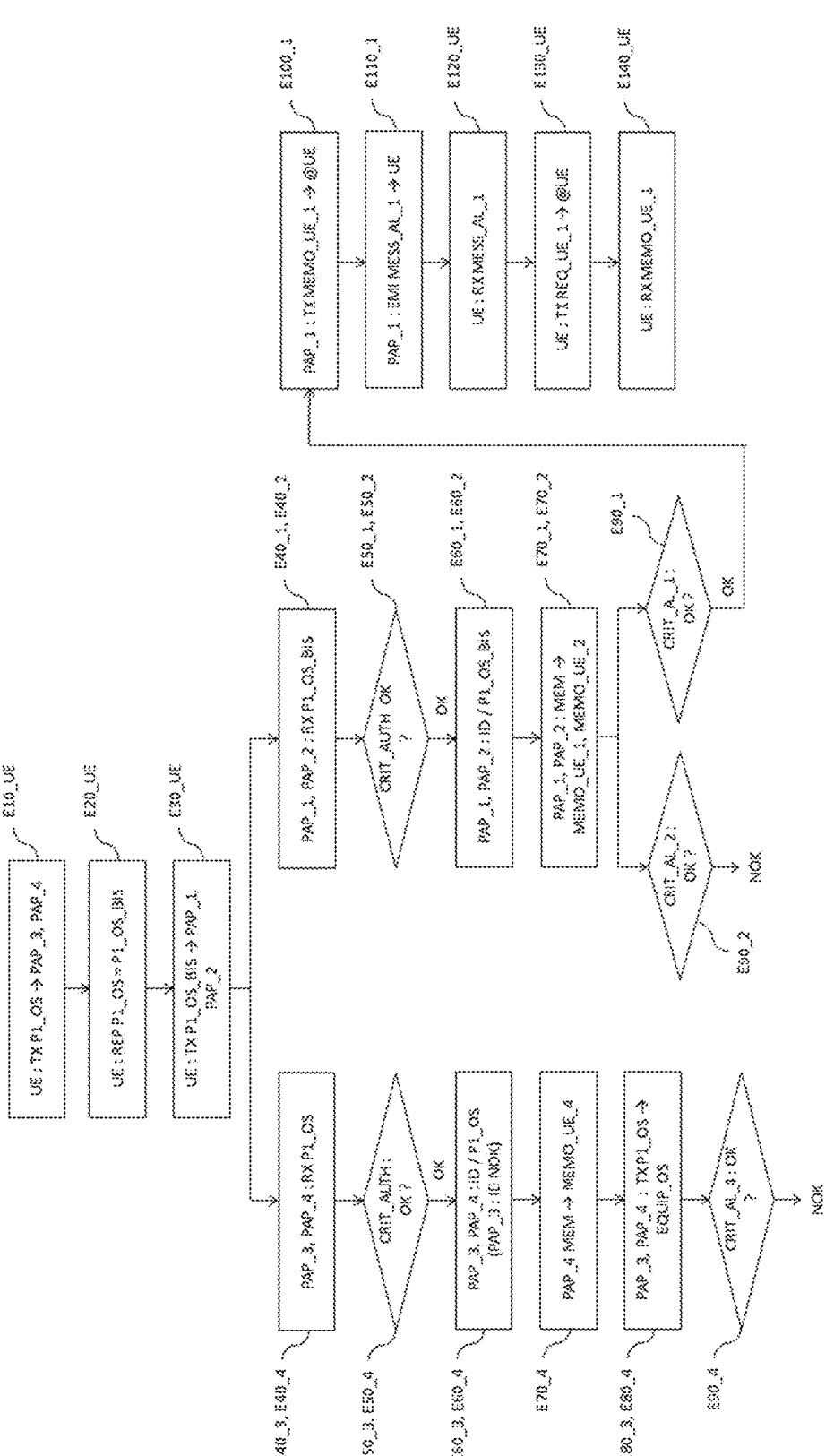
[Fig. 7]

PROCESS FOR SEARCHING FOR SENSITIVE DATA IN AT LEAST ONE DATA PACKET, ASSOCIATED DEVICE AND SYSTEM

CROSS-REFERENCE TO RELATED APPLICATIONS

This Application is a Section 371 National Stage Application of International Application No. PCT/EP2022/081046, filed Nov. 8, 2022, the content of which is incorporated herein by reference in its entirety, and published as WO 2023/083770 on May 19, 2023, not in English.

PRIOR ART

This invention belongs to the general field of telecommunications. It more specifically relates to a method for searching for sensitive data in traffic emitted by at least one terminal connected to a network. It also relates to a device configured to implement said searching method, and a system including such a device as well as a communication terminal able to gain awareness of sensitive data detected by said device. The invention has a particularly advantageous, though in no way limiting, application in the context of a service for searching for sensitive data offered to users by a provider of access to a "global" network such as the Internet network or an Intranet network.

The constant development of information technology, and its ever-increasing adoption and use by users, contribute to the transmission of a considerable amount of data over the communications networks making use of these technologies.

The transmission of these data is conventionally based on the exchange of data packets emitted by terminals in possession of the users. These can of course be data whose user knows they will be transmitted, for example when a telephone call is made by means of a mobile phone.

However, this can also relate to data inserted into packets by a software program equipping a terminal in the possession of a user and transmitted, from the terminal to a remote equipment item (server, software instance, etc.), without said user knowing. In particular, it is known that the operating system or systems equipping the terminal of a user, along with the software applications installed on this terminal, can transmit data without said user knowing to remote equipment items, such as for example servers accessible via a network (e.g. the Internet network), data which are managed by the manufacturer/designer of said operating system/ of said or application or applications.

By way of example without any limitation, data transmitted without a user knowing by the operating system of a user's mobile phone may be any one item from among:
  an IMEI (International Mobile Equipment Identity) number,
  a serial number of the mobile phone,
  a serial number of the SIM card inserted into the mobile phone,
  a phone number,
  a local IP address,
  a MAC (Media Access Control) hardware address of said mobile phone, or applicably one or more MAC hardware addresses of terminals located in the neighborhood of the mobile phone (for example, following the automatic execution by the mobile phone of a procedure of discovery of MAC hardware addresses for the purpose of a possible association (pairing)), etc. It can moreover be noted that such data are liable to be transmitted without the user knowing even though no SIM card is activated by the mobile terminal.

Data thus transmitted without the user knowing can be the subject of systematic collection by the remote equipment items in question (and thus be described as "telemetry data"), to be ultimately used in the implementation of different types of processing.

Such processing can for example consist in the analysis of an activity of the source (operating system, software application) form which the data transmission originated, thus legitimately making a contribution to improving the operation of said source, for example via the development and provision of updates or corrections (patches) that the user can install on his terminal.

This being so, even taking into account the hypothesis of an entirely honorable intention on the part of a manufacturer/designer of an operation system/of a software application (e.g. a software improvement as described above), the transmission of data without a user knowing nonetheless remains problematic insofar as it contributes to the risk of information relating to the identity of said user being determined using the transmitted data. Such items of information are items of "identification information" as defined by the IETF (Internet Engineering Task Force) in the document RFC 6973 of July 2013.

It should be noted that the fact of being able to obtain such items of identification information from transmitted data makes it possible to classify these data as "sensitive data".

This determination of items of identification information can typically be done by correlating or by combining with one another a number of sensitive data transmitted by different sources (operating system, software application etc.) and/or by correlating or by combining sensitive data of different types transmitted by one and the same source and/or again by correlating or by combining sensitive data transmitted by one or more sources with data transmitted by other software means, such as for example GPS (Global Positioning System) location data, etc.

Furthermore, said items of identification information are not necessarily limited to the identity of the user of the terminal from which the transmission of sensitive data originated, but can also relate more generally to the environment of said user, such as for example other users whose respective terminals are located in the neighborhood of the emitter terminal.

It should be noted that the concept of "neighborhood" here refers to terminals located near a given terminal and the presence of which can be discovered, for example, using broadcast mechanisms implemented by said given terminal with a view to a possible association (pairing), the keeping of an ARP (Address Resolution Protocol) table or ND (Neighbor Discovery) table.

By way of example, if sensitive data transmitted by a first terminal discloses MAC hardware addresses (or any other persisting identifier) of other terminals located in the neighborhood of said first terminal, it is possible to access (conditional on the implementation of suitable correlations with other data) items of identification information relating to the users of these other terminals, such as for example items of information relating to social acquaintances, centers of interest, places visited etc. What is more, these items of identification information can be determined even though these other terminals support an operating system separate from that supported by the first terminal transmitting said sensitive data.

Finally, the transmission of sensitive data without the users of terminals knowing represents a threat to their privacy, especially since developments in the complexity of operating systems, along with the large increase in software applications, tends to increase still further the volume of these sensitive data transmitted over communications networks.

SUMMARY OF THE INVENTION

The subject of this invention is to remedy all or part of the drawbacks of the prior art, particularly those described above, by making provision for a solution that makes it possible to know whether or not sensitive data are transmitted by at least one terminal (typically without it knowing), so as to offer an entity to which said least one terminal belongs the possibility of gaining awareness of the exposure of items of identification information concerning it or else concerning its environment.

Within the meaning of this invention, an entity can refer to a user or an administrator of said at least one terminal. The concept of administrator typically refers to a person (physical or legal) in charge of the management of said at least one terminal. By way of example without any limitation, this can be a parent responsible for managing a plurality of mobile phones respectively used by his children, or else a company responsible for managing a plurality of terminals deployed in the premises it occupies and used by employees.

The concept of "entity" is not, however, limited to the preceding cases, and also relates, in the context of this invention, to cases where the entity in question refers to:

an access network to which said at least one terminal is connected, and connected to the network via which said destination equipment item is accessible, or a local network to which said at least one terminal is connected, and connected to said access network.

The inclusion of these other cases of application stems in particular from the fact that a network (i.e. one or more equipment items belonging to said network) is able to insert data into packets emitted by at least one terminal.

To allow an entity to which said at least one terminal belongs to gain awareness of the exposure concerning it or else concerning its environment, the invention relates, in a first aspect, to a method for searching for so-called sensitive data in at least one data packet emitted by at least one terminal connected to a network, said at least one data packet having as destination a so-called "destination" equipment item accessible via said network, items of identification information relating to the identity and/or environment of an entity to which said at least one terminal belongs being able to be determined from sensitive data having been inserted into said at least one packet before it reaches said destination equipment item. Said method includes steps implemented by a searching device separate from said destination equipment item, including:

receiving said at least one data packet, searching for sensitive data in said at least one data packet, and, if sensitive data are detected in said at least one packet, providing said entity with items of information about said detected sensitive data.

Thus, the searching method according to the invention makes provision for sensitive data to be searched for, and where applicable detected, in at least one data packet emitted by said at least one terminal, and more specifically for this search and this detection to be carried out by a different device to the remote equipment item to which said at least one data packet is initially addressed. In this way, the identification of sensitive data can for example be carried out before said at least one packet has even reached the destination equipment item associated with it (the term "identification" here refers to the result of the searching step of the method according to the invention, and therefore more specifically refers to the detection, as such, of sensitive data in said at least one data packet; the "identification" is therefore separate from the "search" within the meaning of this invention).

By proceeding in this way, the invention makes it possible to determine whether or not sensitive data have been inserted, during the routing of said at least one data packet, by one or more sources (e.g. operating system of a terminal, software application installed on a terminal, access network or optionally local network) in said at least one data packet, particularly without the user of said at least one terminal knowing.

Note that the concept of "insertion" of sensitive data into a data packet covers, within the meaning of this invention, two cases, namely:

a first case in which sensitive data are contained in a data packet as soon as it is emitted by said at least one terminal. By way of example, such a packet can be emitted by an operating system or a software application installed on said at least one terminal;

a second case in which a data packet originally transmitted by said at least one terminal is modified, during its routing toward said destination equipment item, by a (source) entity other than said at least one terminal, so as to incorporate sensitive data into it.

Furthermore, the providing step advantageously makes it possible to give the entity access to items of information relating to the sensitive data thus detected. These items of information can for example be sensitive data detected themselves, but also consist in an inventory of the destination equipment item or items reached by the transmitted packets, or even also to results of processes carried out based on the detected data (e.g. analysis of dependency between several destinations, so as to detect a risk of correlation between sensitive data transmitted in separate connections of said at least one terminal).

These items of information provided to the entity thus reflect, in a sense, a trace left over time (i.e. as the data packets are received and analyzed by a searching device according to the invention) by said at least one terminal over the network or networks via which the emitted packets are routed. Put still otherwise, the items of information provided to the entity constitute a sort of dashboard representative of a digital identity of said at least one terminal.

What is more, within the meaning of this invention, the concept of digital identity is not solely defined for a terminal, but can also be derived from sensitive data associated, where applicable, with the different terminals belonging to an entity. It is then possible to refer to "the digital identity of an entity" (e.g. digital identity of a network or of an administrator of a plurality of terminals).

The searching method according to the invention thus advantageously offers the entity the possibility of setting up, monitoring and controlling the activity of said at least one terminal belonging to it. The benefits are thus twofold for the entity in question given that it is offered the possibility of having access to its digital identity, but also of introducing corrective actions in the aim of avoiding the disclosure, without it knowing, of items of identification information relating to its identity and/or its environment (e.g. other terminals hosted in the same local network).

It should be noted that the searching method according to the invention can be part of a service offered by a service provider in charge of managing the searching device, such as for example the access provider responsible for the management and maintenance of the network via which said destination equipment item is accessible.

Another particularly important aspect of the searching method according to the invention lies in the fact that the searching device implementing said method is located appropriately to receive (and not intercept) said at least one data packet, and thus to decipher its content. In other words, the searching device is located such that said at least one data packet it receives is actually addressed to it, without having to perform an interception without the user of said at least one terminal knowing. It is therefore apparent from these details that the procedure for which the invention makes provision is initiated at the request of the entity to which said at least one terminal belongs.

Thus, and as will be described in more detail below, the searching device can for example be located on a route for routing data packets. Such a route is for example configured as default at the level of said at least one terminal, or else can be a route set up dynamically to allow the routing of said at least one data packet.

Alternatively (if the searching device is not placed on any route for routing data packets) or in addition to these provisions, the searching device can be connected to the terminal using at least one communication tunnel able to force the routing of data packets of said at least one terminal toward the searching device. Advantageously, said at least one tunnel is configured to implement a secure connection.

In particular modes of implementation, the searching method may include one or more of the following features, taken in isolation or in any technically possible combination.

In particular modes of implementation, the searching device is located on a route for routing said at least one data packet to said destination equipment item, said method further including a transmitting step implemented by said searching device and consisting, once the search for sensitive data has been carried out, in relaying said at least one data packet to the destination equipment item.

Such provisions allow the searching device to act as a proxy between said at least one terminal and the destination equipment item to which a data packet is addressed. In other words, the searching device here possesses routing information needed to transmit the packet (in other words, to relay said packet) to said destination equipment item.

In particular modes of implementation, said searching device is connected to the terminal using at least one tunnel, said at least one data packet received by the searching device being a copy of an original data packet transmitted to the destination equipment item, said copy being transmitted via said at least one tunnel and not being relayed by said searching device to the destination equipment item.

Advantageously, said copy is transmitted via said at least one tunnel by means of a secure connection, thus making it possible to detect any modification of data as transmitted by the source from which said at least one data packet originates.

In particular modes of implementation, the searching step includes:

comparing the data contained in said at least one packet with a filtering list associated with said at least one terminal, and/or
    comparing the data contained in said at least one packet with a dictionary associated with said searching device, and/or executing an automatic learning algorithm to detect recurring data patterns contained in said at least one data packet.

Within the meaning of this invention, the term "dictionary" refers to the set of sensitive data that the searching device is able to identify. This dictionary thus depends on a parameterization of the searching device.

A filtering list, meanwhile, characterizes, for example, the sensitive data that the entity to which said at least one terminal belongs wants to have identified. The granularity of such a filtering list can be adjusted, for example by specifying only one or more potential sources of sensitive data (operating system, application, local network, access network etc.) or else by specifying, for one or more given sources, what sensitive data must imperatively be identified (specific header(s) in data packets, etc.).

In a variant embodiment, a filtering list can also characterize the only data that the entity allows to be transmitted to one or more destination equipment items. In other words, the searching device can identify (using its dictionary), as sensitive data, any datum that does not belong to said filtering list.

Note that the dictionary associated with the searching device can be included in a filtering list associated with a terminal, or else encompass said filtering list, or else be of empty intersection with said filtering list.

In particular modes of implementation, the providing step includes, if an alert criterion is satisfied, the emitting of an alert message configured to allow access of the entity to said items of information about the detected sensitive data.

The recipient of the alert message can be, for example, the user of said at least one terminal or else said entity in the case where a plurality of terminals belong to it (e.g. network or administrator of a plurality of terminals).

In particular modes of implementation, sensitive data are inserted into said at least one packet by at least any one of the components from among:

an operating system equipping said at least one terminal,
    a software application installed on said at least one terminal,
    an access network to which said at least one terminal is connected, and connected to the network via which said destination equipment item is accessible,
    a local network to which said at least one terminal is connected, and connected to said access network.

Note that it is conventional to consider an operating system or a software application as a source of sensitive data. However, and as already described above, the invention is not limited to this type of source, but also covers the case of sensitive data transmitted (typically without the user of said at least one terminal knowing) by the local network and/or by the access network. This is because these networks are able to inject sensitive data into packets emitted by said at least one terminal toward the network via which said destination equipment item is accessible. The injection of these data is for example done at application level (e.g. in the headers of the communication protocol used for data transmission such as, for example, the HTTP protocol, in the TCP options, in the IPv4 options, in the IPv6 extension headers, in the UDP options, etc.).

In other words, the fact of considering certain data injected by the local network and/or by the access network as sensitive data advantageously makes it possible to expand the concept of sensitive data, and therefore to ultimately improve the assessment of the risk of items of identification information relating to the entity to which said at least one terminal belongs and/or its environment being accessible without it knowing. Hence, the digital identity set up by the searching device is global.

In particular modes of implementation, a sensitive datum is any of the items in a list comprising:

a datum of location of said at least one terminal, an IMSI or MSISDN or IMEI number associated with said at least one terminal (acronyms of International Mobile Subscriber Identity, Mobile Station International Subscriber Directory Number, and International Mobile Equipment Identity), a SIM card number equipping said at least one terminal, an identifier of an access network connected to the network via which said destination equipment item is accessible and/or an identifier of an operator in charge of managing said access network, when said at least one terminal is connected to a local network connected to an access network itself connected to the network via which said destination equipment item is accessible, an identifier of said local network and/or a persistent identifier of a destination equipment item (CPE) making the connection between the local network and the access network, an IP address or a hardware address of said at least one terminal, an IP address or a hardware address of at least one other terminal positioned in a neighborhood of said at least one terminal having emitted said at least one packet, a persistent identifier associated with said at least one terminal (e.g. a hardware serial number).

In particular modes of implementation, the searching step is implemented if a criterion of authorization to search for sensitive data for said at least one terminal is satisfied.

Said authorization criterion is for example representative of a subscription on behalf of the user of a mobile terminal (or User Equipment (UE)) to a contract with the access provider responsible for managing an access network. This contract more specifically concerns a paid service, offered by said access provider to allow the analysis of data packets, with the aim of detecting sensitive data and thus offering the possibility of gaining awareness of the exposure of items of identification information.

Conversely, it can also be envisioned, for example, for the service provided by the access provider to be free, said authorization criterion then referring to the consent granted by the entity for the sensitive data to be identified in packets emitted by said at least one terminal.

According to a second aspect, the invention relates to a computer program including instructions for implementing a searching method according to the invention when said computer program is executed by a computer.

This program can use any programming language, and be in the form of source code, object code or intermediate code between source code and object code, such as in a partially compiled form, or in any other desirable form.

According to a third aspect, the invention relates to an information or recording medium readable by a computer, on which is recorded a computer program according to the invention.

The information or recording medium can be any entity or device capable of storing the program. For example, the medium can include a storage means, such as a ROM, for example a CD-ROM or a microelectronic circuit ROM, or else a magnetic storage means, for example a hard disk.

Moreover, the information or recording medium can be a transmissible medium such as an electrical or optical signal, which can be routed via an electrical or optical cable, by radio or by other means. The program according to the invention can in particular be downloaded over a network such an IP network, such as, typically, the Internet network.

Alternatively, the information or recording medium can be an integrated circuit into which the program is incorporated, the circuit being suitable for executing or being used in the execution of the method in question.

According to a fourth aspect, the invention relates to a device for searching for so-called sensitive data in at least one data packet emitted by at least one terminal connected to a network, said at least one data packet having as destination a so-called "destination" equipment item accessible via said network, items of identification information relating to the identity and/or environment of an entity to which said at least one terminal belongs being able to be determined from sensitive data having been inserted into said at least one packet before it reaches said destination equipment item. Said searching device is separate from said destination equipment item and includes:

a receiving module configured to receive said at least one data packet, a searching module configured to detect sensitive data inserted into said at least one data packet, a providing module configured to provide said entity, if said sensitive data are detected in said at least one packet, with items of information about said detected sensitive data.

In particular embodiments, the searching device an further include one or more of the following features, taken in isolation or in any technical possible combination.

In particular embodiments, said searching device is deployed in:

the network via which said destination equipment item is accessible, an access network connected to the network via which said destination equipment item is accessible, when said at least one terminal is connected to a local network connected to an access network itself connected to the network via which said destination equipment item is accessible, said local network.

In particular embodiments, said searching device is located on a route for routing at least one data packet toward said destination equipment item or is connected to the terminal by a tunnel.

According to a fifth aspect, the invention relates to an aggregating device including:

a receiving module configured to receive, coming from a plurality of searching devices according to the invention, sensitive data detected by said searching devices in at least one data packet emitted by at least one terminal connected to a network, said at least one data packet having as destination a so-called "destination" equipment item accessible via said network, items of identification information relating to the identity and/or environment of an entity to which said at least one terminal belongs being able to be determined from sensitive data having been inserted into said at least one packet before it reaches said destination equipment item, a providing module configured to provide said entity with items of information about the sensitive data received from said searching devices.

According to a sixth aspect, the invention relates to a communication terminal including:

an emitting module configured to emit at least one data packet in a network, said at least one data packet having as destination a so-called "destination" equipment item accessible via said network, items of identification information relating to the identity and/or environment of an entity to which said terminal belongs being able to be determined from sensitive data having been inserted into said at least one packet before it reaches the destination equipment item, an access module configured to access items of information about sensitive data detected in said at least one data packet.

The items of information the communication terminal can access, by means of its access module, are items of information provided by a searching device according to the invention.

By way of example, said items of information the communication terminal is able to access using its access module are items of information provided to the entity by a searching device according to the invention.

In particular embodiments, said communication terminal further includes a copying module configured to duplicate at least one data packet intended to be transmitted to a destination equipment item, the communication terminal being configured to transmit said copy to said at least one searching device according to the invention.

As already described previously, the transmission of a copy of a data packet can for example be done via at least one tunnel connecting the communication terminal and said at least one searching device. Furthermore, such a copy is not intended to be relayed by said at least one searching device toward the destination equipment item.

According to a sixth aspect, the invention relates to a so-called sensitive data managing system including at least one searching device according to the invention and at least one communication terminal according to the invention.

BRIEF DESCRIPTION OF THE DRAWINGS

Other features and advantages of this invention will become apparent from the description given below, with reference to the appended drawings which illustrate an exemplary embodiment devoid of any limitation. In the figures:

FIG. 1 schematically represents, in its environment, a particular embodiment of a sensitive data managing system according to the invention;

FIG. 2 schematically represents an example of a hardware architecture of a searching device belonging to the sensitive data managing system of FIG. 1;

FIG. 3 schematically represents an example of a hardware architecture of another searching device belonging to the sensitive data managing system of FIG. 1;

FIG. 4 schematically represents an example of a hardware architecture of yet another searching device belonging to the sensitive data managing system of FIG. 1;

FIG. 5 schematically represents an example of a hardware architecture of yet another searching device belonging to the sensitive data managing system of FIG. 1;

FIG. 6 schematically represents an example of a hardware architecture of a communication terminal belonging to the sensitive data managing system of FIG. 1;

FIG. 7 represents, in the form of a flow chart, a particular mode of a method for processing data, the so-called "general method" implemented by the sensitive data managing system of FIG. 1, said mode encompassing a particular mode of a communication method according to the invention and implemented by the terminal of FIG. 6, as well as particular modes of a searching method according to the invention and respectively implemented by the searching devices of the FIGS. 2, 3, 4 and 5, FIG. 8 schematically represents an example of a hardware architecture of an aggregating device belonging to the sensitive data managing system according to an embodiment of the invention.

DESCRIPTION OF THE EMBODIMENTS

FIG. 1 schematically represents, in its environment, a particular embodiment of a sensitive data managing system SYS according to the invention.

In the embodiment of FIG. 1, the sensitive data managing system SYS includes a plurality of entities, including in particular a communication terminal UE.

As illustrated by FIG. 1, the system SYS includes in this embodiment a single terminal UE. Said terminal UE is owned by a user (not shown in the figures and also considered as single) and corresponds in this embodiment to a smartphone. This being the case, no limitation is attached to the nature of the terminal UE which can thus interchangeably take the form of a digital tablet, a portable computer, a personal digital assistant, etc.

The fact of considering only a single terminal UE within the sensitive data managing system SYS is only a choice made for the purpose of simplifying the description. It should thus be noted that, in general, no limitation is attached to the number of terminals that can be considered in the context of this invention. Moreover, if the sensitive data managing system SYS includes several terminals, nothing precludes a user from being in possession of all or some of these terminals, in which case it can be viewed as an administrator of terminals that it has in its possession.

The terminal UE is connected to an access network NET_ACC, the management of which is ensured by a network operator (or else an access provider) from which the user of the terminal UE has taken out an access subscription.

More specifically, in the embodiment of FIG. 1, the terminal UE is first connected to a local network NET_LOC, for example by means of an access point (not shown in the figures), said local network NET_LOC being itself connected to the access network NET_ACC by means of a dedicated equipment item. In a manner known per se, such a dedicated equipment item is of CPE (Customer Premises Equipment) type, and is for example a home gateway (or residential gateway).

In accordance with the invention, the access network NET_ACC is itself connected to a so-called "global" network NET_GLOB via which the terminal UE can transmit data (emitted in the form of data packets).

By way of example without any limitation, the terminal UE corresponds to the property of a person who is connected to the local network NET_LOC provided by a WLAN (Wireless Local Access Network) access point to cover one or more parts of the home of said person (the local network NET_LOC therefore corresponds here to a home network). In this example, the global network NET_GLOB corresponds to the Internet public network, and the access network NET_ACC is the network of an Internet access provider from which said user has taken out a subscription.

Of course, other examples of configuration may be envisioned. In particular, nothing precludes the considering of a global network NET_GLOB that differs from the Internet network.

Thus, according to another example, said global network NET_GLOB may be a network that is the property of a company and deployed between the premises of said company by means of dedicated infrastructures, or else a VPN (Virtual Private Network) network, again deployed by said company. Furthermore, in this example, the access network NET_ACC may be an intranet network of a site of the company. The local network NET_LOC, meanwhile, may be a network deployed in a targeted part of the premises of the company.

In general, no limitation is attached to the context in which said local NET_LOC, access NET_ACC and global NET_GLOB networks are deployed, such that the nature of these networks does not constitute a limiting factor of the invention. However, to define a descriptive framework, it will henceforth be considered without any limitation that the global network NET_GLOB is the Internet network.

It is moreover important to note that the fact of envisioning that the terminal UE is connected to the access network NET_ACC via the local network NET_LOC constitutes only one variant of implementation of the invention. Thus, nothing precludes, for example, the envisioning of another variant in which the terminal UE is directly connected to the access network NET_ACC, since no local network is deployed (and therefore no local CPE equipment item is used for the routing of data packets emitted by the terminal UE).

Nor does anything preclude the envisioning of yet another variant of implementation of the invention in which a local network NET_LOC is deployed in a way similar to the configuration of FIG. 1, and in which the terminal UE is equipped with a first interface allowing it to connect to said local network NET_LOC (for example a WLAN interface to connect to a local network NET_LOC), along with a second interface allowing it to connect directly to the access network NET_ACC (for example a 5G interface to connect to an access network NET_ACC of cellular type deployed by a mobile telephony operator).

As illustrated by FIG. 1, a single access network NET_ACC is considered in this embodiment, such that the equipment item CPE is connected to this single access network NET_ACC. However, such dispositions are here adopted solely for the sake of simplifying the description, and it of course remains possible to envision an equipment item CPE connected to a plurality of separate access networks (the "multi-homing" concept).

Conventionally, the terminal UE is configured to emit data packets through the access network NET_ACC, these packets being then intended to travel over the Internet network NET_GLOB.

For this purpose, the terminal UE includes software and/or hardware means configured to emit said data packets. In particular, in this embodiment, the terminal UE is equipped with an operating system OS along with a plurality of software applications APP_1, . . . , APP_N (N being an integer index greater than or equal to 1).

Nothing, however, precludes the envisioning of said terminal UE being equipped with no application.

Said operating system OS (or respectively an application APP_i, i being any index between 1 and N) is able to transmit data packets, each of these packets having as destination a so-called "destination" equipment item accessible via the Internet network NET_GLOB, and it being understood that a plurality of destination equipment items may be used, simultaneously or else sequentially over time, by said operating system OS (or said application APP_i respectively).

For the remainder of the description, it will be considered without limitation, and solely for the sake of simplifying the description, that the operating system OS (or said application APP_i respectively) transmits data packets to a single destination equipment item EQUIP_OS (or EQUIP_APP_i respectively). Said destination equipment item EQUIPOS (or EQUIP_APP_i respectively) typically includes one or more servers, the management of which is done by the manufacturer/designer of said operating system OS (or said application APP_i respectively).

When an equipment item includes a plurality of servers, these servers can, for example, be located within one and the same structure (for example in a so-called "cloud" infrastructure), or else be distributed within a plurality of suitable structures.

In a known manner, the data packets transmitted by the operating system OS (or the application APP_i respectively) to the destination equipment item EQUIP_OS (EQUIP_APP_i respectively) may contain data from which it is possible to determine items of identification information relating to the identity and/or environment of the user possessing the terminal UE.

Note that the fact of being able to obtain such items of identification information from such data inserted into the transmitted packets (typically without the user knowing of the terminal UE) makes it possible to classify these latter as "sensitive data".

Note also that one or more applications embedded in the terminal UE can for example be supplied by the developer of the operating system OS itself. In this case, the risk that particularly precise items of identification information may be derived from a correlation between the data emitted by these applications and the operating system OS is even higher.

The concept of "user environment" refers to any entity with which it is possible to associate an identity of its own (i.e. which can be used to distinguish it from another entity). It can, for example, be terminals (and therefore, ultimately, users to which they belong) located in the neighborhood of the terminal UE, networks via which the terminal UE transmits data, items of equipment operated by one or more companies and the operation of which entail the transmission of data over networks also used by the terminal UE, etc.

The obtaining of such items of identification information is done based on the collection of sensitive data transmitted by the operating system OS (or respectively by the application APP_i), as well as by the implementation of specific processing for the sensitive data thus collected. Said processing consists, for example, in extracting or deducing items of identification information from collected sensitive data. They can also consist in correlating the sensitive data collected with other data, such as for example location data of GPS type. Note moreover that the processing in question can be executed by the equipment items EQUIP_OS, EQUIP_APP_i themselves, or else be delegated by these equipment items to dedicated processing means.

In general, those skilled in the art know the types of processing that can be done based on sensitive data (e.g. syntax checking, integrity checking, correlation, aggregation, de-anonymization), so as to be able to determine items of identification information relating to the identity and/or environment of the user who is using the terminal UE.

The point of view taken until now as to the origin of the sensitive data is intended to be conventional insofar as it has been described that these could be transmitted by the operating system OS and/or by the applications APP_1, . . . , APP_N. The invention is not however limited to this type of sensitive data, but also covers the case of sensitive data transmitted (typically without the user knowing of the terminal UE) by the local network NET_LOC and/or by the access network NET_ACC. These networks are indeed able to inject sensitive data into packets emitted by the terminal UE to the Internet network NET_GLOB. The injection of these data is, for example, done at application level (e.g. in the headers of the communication protocol used for the transmission of data such as the HTTP protocol, in the TCP options, in the IPv4 options, in the IPv6 extension headers, in the UDP options, etc.).

The fact of considering as sensitive data certain data injected by the local network NET_LOC and/or by the access network NET_ACC thus advantageously makes it possible to expand the concept of sensitive data, and thus ultimately to improve the assessment of the overall risk of items of identification information relating to the user of the terminal UE and/or to its environment being accessible (typically without it knowing).

In general, within the meaning of the invention, a sensitive datum is any one of the items in a list comprising:

- a datum of location of the terminal UE (e.g. a datum of GPS type),
- an IMSI or MSISDN or IMEI number associated with said terminal UE,
- a SIM card number equipping said terminal UE,
- an identifier of the access network NET_ACC (e.g. an IPv6 prefix of the access network NET_ACC),
- an identifier of said local network (e.g. a prefix IPv6 of the local network NET_LOC, a MAC hardware address of the equipment item CPE),
- an IP address or a MAC hardware address of the terminal UE,
- an IP address or a MAC hardware address of at least one other terminal positioned in a neighborhood of said terminal UE,
- a persistent identifier associated with said at least one terminal (e.g. a hardware serial number).

In its general principle, the invention consists in being able to identify sensitive data inserted into at least one data packet emitted by the terminal UE, before the transmission of said at least one data packet to the Internet network NET_GLOB, and taking into account the fact that the insertion in question is done by at least one source (operating system OS, application APP_i, local network NET_LOC, access network NET_ACC, etc.). What's more, the invention is also based on the fact that such an identification of sensitive data is done by one or more entities of the sensitive data management system SYS which are distinct from the destination equipment items EQUIP_OS, EQUIP_APP_i.

For this purpose, besides the terminal UE, the sensitive data management system SYS also includes, in this embodiment, four so-called "searching" PAP (Provider Assisted Privacy enforcement point) devices: PAP_1, PAP_2, PAP_3, PAP_4. Each searching device PAP_j (j being an integer index between 1 and 4) is configured to carry out processing, making it possible, in particular, to search for sensitive data in data packets emitted by the terminal UE, by implementing a method for searching for sensitive data (more simply referred to as "searching method" in the remainder of the text) according to the invention.

Although said searching devices PAP_j share common elements of hardware and software architecture to implement said searching method, they can also have certain features of their own (and which therefore have an effect on different modes of implementation that can be envisioned for the searching method). The aspects related to the hardware and software architecture of said searching devices PAP_j are addressed in detail further on, this description focusing first on the locations that can be envisioned for each of said searching devices PAP_j.

As illustrated by FIG. 1, the searching device PAP_1 is deployed in the access network NET_ACC. Moreover, said searching device PAP_1 is directly connected to the terminal UE by a communication tunnel TUN_1 making it possible to force the routing of data packets from the terminal UE toward said searching device PAP_1 (i.e. the searching device PAP_1 is not located on any route for routing a data packet to the destination equipment items associated with this packet), and also to set up, in the embodiment described here, a secure connection between these latters.

It should be noted that the transmission of data via said communication tunnel TUN_1 is done, in a manner known per se, by implementing an encapsulation, or else an encryption, of the transmitted data. No limitation is attached to the encapsulation protocol that can be envisioned (IPsec, TLS, QUIC, GRE, DTLS, etc.).

The searching device PAP_2, meanwhile, is deployed in the Internet network NET_GLOB and is, in this embodiment, directly connected to the terminal UE by a single communication tunnel TUN_2 also making it possible to force the routing of data packets from the terminal UE to said searching device PAP_2 and also to set up, in the embodiment described here, a secure connection between these latters.

It should be noted that the fact of considering, in this embodiment, a single tunnel TUN_1 (or TUN_2 respectively) between the terminal UE and the searching device PAP_1 (PAP_2 respectively) constitutes only one variant of implementation of the invention. Thus, nothing precludes the envisioning of other variants in which a plurality of tunnels are deployed between the terminal UE and the searching device PAP_1 (or PAP_2 respectively), these tunnels making it possible, for example, for data to be exchanged between the terminal UE and the searching device PAP_1 (or PAP_2 respectively) using separate respective interfaces (e.g. WLAN, 3G, 4G, 5G, etc.).

Nor does anything preclude the envisioning of other embodiments in which a tunnel does not directly connect the terminal UE and a device PAP_1 (or PAP_2 respectively). For example, the tunnel TUN_1 (or TUN_2 respectively) can be deployed between the CPE and the searching device PAP_1 (or PAP_2 respectively) in the case where said CPE itself contains a searching device PAP.

It can moreover be envisioned for at least one of said tunnels TUN_1, TUN_2 to not be a secure tunnel.

The searching device PAP_3, meanwhile, is incorporated into the equipment item CPE, such that it is located, ultimately, on a route configured as default for the routing of data packets to the destination equipment items EQUIP_OS, EQUIP_APP_i. In this embodiment, the default configuration of said route is more specifically done at the terminal UE. However, nothing precludes the envisioning of a default configuration at the equipment item CPE itself.

In the embodiment of FIG. 1, no communication tunnel is set up between the terminal UE and the equipment item CPE. However, nothing precludes the envisioning of a tunnel being set up between these two entities if, for example, the searching device PAP_3 is deployed in the local network NET_LOC without being contained in the CPE.

The searching device PAP_4 is also deployed in the access network NET_ACC. However, unlike the searching device PAP_1, said searching device PAP_4 is located on a route configured as default at the terminal UE (or at the equipment item CPE) in this embodiment.

As mentioned above, a communication tunnel makes it possible to force the routing of data packets from the terminal UE to a searching device, and therefore proves necessary in the cases of the searching devices PAP_1 and PAP_2 which are not located on a route for routing data packets to the destination equipment items EQUIP_OS, EQUIP_APP_i. The fact remains that the use of a communication tunnel is not limited to such arrangements, and can in particular be envisioned for a searching device already placed on such a route, in particular to secure the transmission of the routed data via said tunnel (e.g. a local root is installed on the terminal UE to be able to involve at least one of said searching devices PAP_3, PAP_4 in a secure connection set up for a route taken by data packets to a destination equipment item).

It should be noted that the fact of envisioning such locations for the searching devices PAP_1, PAP_2, PAP_3, PAP_4 constitutes only one variant of implementation of the invention, and many other variants are also covered by the invention.

Thus, and first of all, it should be mentioned that no limitation is attached to the number of searching devices deployed. Thus, nothing precludes having a single searching device deployed in the access network NET_ACC or in the Internet network NET_GLOB or else contained in the equipment item CPE.

Moreover, in the hypothesis where several searching devices are deployed, neither does anything preclude all or part of said searching devices from being deployed in a sub-set of the list formed by the access network NET_ACC, the Internet network NET_GLOB and the equipment item CPE. Furthermore, even though several searching devices are deployed, these devices are not necessarily all activated.

Finally, no limitation is attached to the number and location of said searching device or devices used for implementing the invention. It is however important to mention that the fact of having a searching device (or where applicable several searching devices) deployed in the Internet network NET_GLOB advantageously makes it possible to check/verify whether or not sensitive data are injected by the local network NET_LOC and/or the access network NET_ACC in data packets emitted by the terminal UE.

The fact that the searching devices PAP_j search for sensitive data in data packets emitted by the terminal UE, and that any sensitive data detected are provided to the user of said terminal UE (as described further on) offers the user the advantageous possibility of being informed that sensitive data are being transmitted (typically without it knowing) by the operating system OS and/or one or more applications APP_i and/or the local network NET_LOC and/or the access network NET_ACC. Hence, the user of the terminal UE can gain awareness of the exposure of items of identification information concerning it or concerning its environment.

The fact of being informed of any sensitive data thus detected also allows the user of the terminal UE to initiate various actions aiming to limit the exposure of its digital identity. By way of example, said user can, in relation with the general conditions of sale of the service or services to which the user has subscribed from its access provider, ask for the termination of its contract, notify an administrative authority in charge of overseeing the protection of personal data in computer processes (e.g. the Commission Nationale de l'Informatique et des Libertés, or CNIL, where France is concerned), ask for the deletion of certain sensitive data at the end of a given period (e.g. deletion of an identifier of the terminal UE), delete such sensitive data itself, etc.

It should be noted that the various actions aiming to limit the exposure of the digital identity can be implemented by an entity other than the user of the terminal UE itself. Specifically, nothing precludes the considering of embodiments of the invention in which several terminals are active. In this case, the entity in question can for example be an entity in charge of the management of said plurality of terminals. These aspects are described in more detail further on.

Different modes of information of the user of the terminal UE can be envisioned, such as for example a mode in which a searching device PAP_j stores the sensitive data it detects in a software file which the user can access (this mode is described in more detail further on). Such a software file can be viewed as a representation of the digital identity of the user of the terminal UE which is deduced from the sensitive data identified by the searching device PAP_j.

This software file can, for example, be directly provided to the user by being transmitted to a reachability address of the terminal UE.

According to another example, a notification can be emitted by the device PAP_j to a contact address of the user (e.g. an e-mail address) which, on receiving said notification, is informed that it can view the software file in question, the latter having been transmitted to a dedicated storage space (e.g. database).

According to another example, the user is immediately notified of each identified sensitive datum, for example via said contact address or else via said reachability address. In other words, in this example, it is not necessary to store detected sensitive data at the level of the searching device PAP_j.

FIGS. 2 and 3 respectively represent examples of hardware architecture of the searching device PAP_3 and the searching device PAP_4 belonging to the sensitive data managing system SYS of FIG. 1. For the rest of the description, an index k equal to 3 or 4 is used to interchangeably refer to the searching device PAP_3 or the searching device PAP_4.

The searching device PAP_k possesses the hardware architecture of a computer. The searching device PAP_k includes, in particular, a processor 1_$k$, a random-access memory 2_$k$, a read-only memory 3_$k$ and a non-volatile memory 4_$k$. It further includes a communicating module 5_$k$.

The read-only memory 3_$k$ of the searching device PAP_k constitutes a recording medium in accordance with the invention, readable by the processor 1_$k$ and on which is recorded a computer program PROG_k in accordance with the invention, including instructions for executing steps of a particular mode of implementation of the searching method according to the invention. The program PROG_k defines functional modules of the searching device PAP_k, which rely on or control the hardware components 1_$k$ to 5_$k$ of the searching device PAP_k mentioned previously, and which in particular comprise in the embodiment described here:

a receiving module MOD_RX_k configured to receive at least one data packet emitted by the terminal UE and having as destination a destination equipment item EQUIP_OS, EQUIP_APP_i, a verifying module MOD_VERIF_k configured to verify whether or not criterion CRIT_AUTH of authorization of identification of sensitive data for the terminal UE is satisfied, a searching module MOD_ID_k configured to search for sensitive data inserted into said at least one data packet, a providing module MOD_DISP_k configured to provide to the user of the terminal UE, where applicable (i.e. if sensitive data are detected in said at least one data packet), items of information about the detected sensitive data, a transmitting module MOD_TRANSMISSION_k configured to relay said at least one data packet to the destination equipment item EQUIP_OS, EQUIP_APP_i associated with said at least one data packet.

In the embodiment described here, the providing module MOD_DISP_k more specifically includes:

a storing sub-module SS_MOD_MEM_k configured to store, if sensitive data associated with the terminal UE are identified in said at least one packet, items of information representative of said sensitive data in a software file MEMO_UE_k associated with said terminal UE. Said software file MEMO_UE_k corresponds, as mentioned above, to a digital identity of the user of the terminal UE which is derived from sensitive data identified by the searching module MOD_ID_k equipping the searching device PAP_k. Note moreover that the storing done by the storing module MOD_MEM_k consists, when repeated over time as part of a search for sensitive data in a plurality of data packets, in an update of said software file MEMO_UE_k, a verifying sub-module SS_MOD_VERIF_k configured to verify whether or not an alert criterion CRIT_AL_k is satisfied, an emitting sub-module SS_MOD_EMI_k configured to emit, if the alert criterion CRIT_AL_k is satisfied, an alert message MESS_AL_k to the terminal UE, said alert message MESS_AL_k being configured to allow the access of said terminal UE to said software file MEMO_UE_k.

The communicating module 5_k, meanwhile, is particularly configured to allow the identifying device PAP_k to receive data coming from the terminal UE, and also to transmit data to the destination equipment items EQUIP_OS, EQUIP_APP_i. For this purpose, the communicating module 5_k contains the receiving module MOD_RX_k along with the transmitting module MOD_TRANSMISSION_k.

Note more particularly that the transmitting module MOD_TRANSMISSION_k with which the identifying device PAP_k is equipped allows the latter to play a role of proxy between the terminal UE and the destination equipment item EQUIP_OS, EQUIP_APP_i to which a data packet is addressed. If this transmitting module MOD_TRANSMISSION_k was not present, then a data packet emitted by the terminal UE to a destination equipment item EQUIP_OS, EQUIP_APP_i and received by the identifying device PAP_k could not be routed beyond said identifying device PAP_k insofar as the latter is placed to intercept the flow between the terminal UE and the appropriate destination equipment item EQUIP_OS, EQUIP_APP_i.

As regards the authorization criterion CRIT_AUTH, this can take various forms according, in particular, to the context in which the invention is implemented.

Thus, according to an exemplary embodiment, said authorization criterion CRIT_AUTH is representative of a subscription of the user of the terminal UE to a service contract with the access provider responsible for managing the access network NET_ACC. This contract can more specifically concern a paid service offered by said access provider to allow the analysis of data packets, in the aim of detecting sensitive data therein and thus offering the possibility of gaining awareness of the exposure of items of identification information. Consequently, in this exemplary embodiment, it is possible for the authorization criterion CRIT_AUTH to not be satisfied if, for example, the user has not subscribed to said paid service, or if the user is late in the payment of a monthly subscription to said paid service, etc.

According to another exemplary embodiment, said authorization criterion CRIT_AUTH is representative of the consent the user of the terminal UE grants the access provider responsible for managing the access network NET_ACC to the analyzing of data packets, this consent of the user being given independently of any subscription to a contract concerning a service such as that forming the subject of the preceding example. In other words, in this exemplary embodiment, the service provided by the access provider is a free service offered to the user of the terminal UE, the latter having simply to grant its consent for this service to be active. Consequently, in this exemplary embodiment, it is possible for the authorization criterion CRIT_AUTH to not be satisfied if, for example, the user of the terminal UE has not granted its consent to the access provider.

It should be noted that the fact of taking into account an authorization criterion CRIT_AUTH (and therefore, ultimately, the taking into account of a verifying module MOD_VERIF_1) is, within the meaning of the invention, optional. This is because nothing precludes the envisioning, for example, of the access provider offering de factor and free of charge a service consisting in detecting sensitive data in data packets, such that by choosing precisely this access supplier, the user of the terminal UE knows that its data packets will be the subject of an analysis.

For the remainder of the description and for the purpose of simplifying it, it will henceforth be considered without any limitation that each searching device PAP_1, PAP_2, PAP_3, PAP_4 is configured to verify one single authorization criterion CRIT_AUTH representative of a subscription of the user of the terminal UE to a contract from the access provider responsible for managing the access network NET_ACC.

In this embodiment, the alert criterion CRIT_AL_k, meanwhile, is related to (is defined as a function of) a threshold beyond which the alert message MESS_AL_k is emitted. This so-called "exposure threshold S_EXP_k" has the aim of quantifying the level of exposure of the user of the terminal UE, i.e. the risk of the identity of an entity such as the user of the terminal UE being compromised based on the sensitive data detected by the searching module MOD_ID_k equipping the identifying device PAP_k.

The exposure threshold S_EXP_k can for example be defined based on an encoding of bits. More precisely, this encoding can consist in associating a certain number of bits with the sensitive data so as to characterize their contribution to the identification of the user of the terminal UE. Such an approach makes it possible to measure in a unified and global manner the exposure of an entity through detected sensitive data. Moreover, even if data directly revealing the identity of the user are not present in the identified sensitive data (such as for example so-called PII or Personally Identifiable Information data), other items of information conveyed in data packets emitted by the terminal UE may make it possible to establish single profiles, and therefore to ultimately trace the user of the terminal UE (for example, by correlation with GPS-type data). It will also be understood that the greater the number of bits needed to characterize the exposure threshold S_EXP_k, the lower the probability of tracing a user. By way of example without any limitation, an exposure threshold S_EXP_k encoded over 32 bits is better than an exposure threshold S_EXP_k encoded over 16 bits.

Moreover, in this embodiment, besides being related to said exposure threshold S_EXP_k, the alert criterion CRIT_AL_k is also related to (defined as a function of) a parameterization (hardware and/or software) of the search module MOD_ID_k, this parameterization defining the sensitive data that the searching device PAP_k sets out to search for.

Specifically, and in general, it is important to note that the searching devices PAP_1, PAP_2, PAP_3 and PAP_4 are not necessarily all parameterized to detect identical sensitive data. Thus, within the meaning of this invention, all the sensitive data that a searching device PAP_j (j ranging from 1 to 4) is able to detect (and thus, ultimately, the parameterization itself of said identifying device PAP_j) is referred to as a "dictionary".

To illustrate this "dictionary" concept as regards the device PAP_k, an exemplary embodiment may be considered in which said searching device PAP_k identifies sensitive data as a function of a profile associated with the terminal UE and defined (chosen, parameterized) by the user of said terminal UE. More particularly, the user can define, for example by means of an interface (screen, keyboard etc.) of its terminal UE or else directly from the access provider, a filtering list characterizing the sensitive data that said user wants to have identified. The granularity of such a filtering list can be adjusted, for example by specifying only one or more sources (operating system OS, application APP_i, local network NET_LOC, access network NET_ACC), or else by specifying, for one or more given sources, what sensitive data must imperatively be identified (specific header(s) in message packets, etc.).

According to a variant embodiment, it is also possible to define at the level of the terminal UE a filtering list characterizing the only data that the user authorizes to be transmitted to one or more destination equipment items. In other words, according to this variant, the searching device PAP_k can identify (using its dictionary), as sensitive data, any datum that does not belong to said filtering list and that can therefore contribute to satisfying the alert criterion CRIT_AL_k (e.g. detection of a new destination equipment item and/or new header of messages not featuring in a list of destination equipment items and/or headers associated with the terminal UE).

The parameterization of the identifying device PAP_k, to define the sensitive data that the device sets out to identify, is not limited to the examples detailed above. Thus, nothing precludes, for example, the consideration of a parameterization enabling the identification of only a subset of the sensitive data associated with a profile associated with the terminal UE.

According to yet another example, it can be envisioned that the identifying device PAP_k is parameterized so as to identify, where applicable in addition to sensitive data specified by a profile associated with the terminal UE, sensitive data which are not themselves specified by said profile. These sensitive data that do not feature in the profile associated with the terminal UE can, for example, be defined in a profile associated with the identifying device PAP_k and configured by the access provider to the access network NET_ACC.

In general, no limitation is attached to the way in which the alert criterion CRIT_AL_k is defined, in particular as regards, where applicable, the value of the exposure threshold S_EXP_k and/or the configuration of the searching module MOD_ID_k.

It is important to note that, similarly to what has been previously described concerning the authorization criterion CRIT_AUTH, the taking into account of the alert criterion CRIT_AL_k is, within the meaning of this invention, optional. Specifically, nothing precludes the envisioning, for example, of the items of information representative of sensitive data being stored in the software file MEMO_UE_k associated with said terminal UE, but this memory storage never triggering any alert.

Finally, in this embodiment, the alert message MESS_AL_k includes a contact address @UE_k associated with the entity to which the terminal UE belongs (i.e. said user in the example envisioned here). Said contact address @UE_k points to a memory space (e.g. cloud) in which the software file MEMO_UE_k is transferred by the searching device PAP_k to be stored there. In this way, the user can decide to download the software file MEMO_UE_k based on said contact address @UE_k when he receives the alert message MESS_AL_k, so as to be able to view said file MEMO_UE_k using an appropriate interface (e.g. telephone screen).

Nothing, however, precludes the envisioning of other variant embodiments, in which, for example, the alert message MESS_AL_k includes the software file MEMO_UE_k, which is therefore transmitted directly to the terminal UE (i.e. using a reachability address of said terminal UE) without the latter needing to connect to a contact address.

According to yet other variant embodiments, no alert message MESS_AL_k is transmitted, the user of the terminal UE being able to view said software file MEMO_UE_k whenever it seems appropriate, for example by sending a request to the identifying device PAP_k so that it directly transmits said software file MEMO_UE_k (it will be understood that in this case the presence of the transmitting module MOD_EMI_k is unnecessary).

FIG. 4 and FIG. 5 respectively represent examples of hardware architecture of the searching device PAP_1 and of the searching device PAP_2 belonging to the sensitive data management system SYS of FIG. 1. For the remainder of the description, an index p equal to 1 or 2 is used to interchangeably denote the searching device PAP_1 or the searching device PAP_2.

The searching device PAP_p possesses the hardware architecture of a computer. Thus, the searching device PAP_p includes, in particular, a processor $1\_p$, a random access memory $2\_p$, a read-only memory $3\_p$ and a non volatile memory $4\_p$. It further includes a communicating module $5\_p$.

The read-only memory $3\_p$ of the searching device PAP_p constitutes a recording medium in accordance with the invention, readable by the processor $1\_p$ and on which is recorded a computer program PROG_p in accordance with the invention, including instructions for executing steps of a particular mode of implementation of the searching device according to the invention. The program PROG_p defines functional modules of the searching device PAP_p, which are based on or control the hardware components $1\_p$ to $5\_p$ of the searching device PAP_p mentioned previously, and which in particular comprise in the embodiment described here:

a receiving module MOD_RX_p configured to receive at least one data packet corresponding to a copy of an original data packet transmitted to a destination equipment item EQUIP_OS, EQUIP_APP_i, said copy being transmitted by means of a secure connection between said terminal UE and said searching device PAP_p (said secure transmission being more particularly carried out via the tunnel TUN_p). Furthermore, said copy is not relayed by said searching device PAP_p to the destination equipment item EQUIP_OS, EQUIP_APP_i, a verifying module MOD_VERIF_p configured to verify whether or not the criterion CRIT_AUTH of authorization of identification of sensitive data for the terminal UE is satisfied, a searching module MOD_ID_p configured to detect sensitive data inserted into the copy of said at least one original packet, a providing module MOD_DISP_p configured to provide the user of the terminal UE, where applicable (i.e. if sensitive data are detected in said copy), with information about the detected sensitive data.

Similarly to that which has been described above for the devices PAP_3 and PAP_4, the providing module MOD_DISP_p more particularly includes, in the embodiment described here:

a storing sub-module SS_MOD_MEM_p configured to store, if sensitive data associated with the terminal UE are identified in said copy, items of information representative of said sensitive data in a software file MEMO_UE_p associated with said terminal UE, a verifying sub-module SS_MOD_VERIF_p configured to verify whether or not an alert criterion CRIT_AL_k is satisfied, an emitting module SS_MOD_EMI_p configured to emit, if the alert criterion CRIT_AL_p is satisfied, an alert message MESS_AL_p to the terminal UE, said alert message MESS_AL_p being configured to allow access of said terminal UE to said software file MEMO_UE_p (the alert message MESS_AL_p includes a contact address @UE_p associated with the entity to which the terminal (UE) belongs.)

The communicating module 5_p, meanwhile, is particularly configured to allow the identifying device PAP_p to receive data coming from the terminal UE. For this purpose, the communicating module 5_p contains the receiving module MOD_RX_p.

The architecture of the searching device PAP_p can be distinguished from that of the searching device PAP_k in that the searching device PAP_p is intended to receive, via the terminal UE, copies of original data packets. Said searching device PAP_p is thus placed away from of the searching device PAP_k which is in particular configured to relay a data packet (proxy mode using the transmitting module MOD_TRANSMISSION_p). Contrariwise, the searching device PAP_p is not equipped with a transmitting module, such that it is not configured to relay a copy of a packet to a destination equipment item EQUIP_OS, EQUIP_APP_i to which the associated original data packet is addressed.

The fact remains that all the technical considerations described above concerning the alert criterion CRIT_AL_k and the parameterization of the searching module MOD_ID_k are still applicable here as regards the alert criterion CRIT_AL_p and the searching module MOD_ID_p. Moreover, nothing precludes the envisioning of the exposure threshold S_EXP_p (or the parameterization of the searching module MOD_ID_p respectively) being different from the exposure threshold S_EXP_k (or from the parameterization of the searching module MOD_ID_k respectively).

It should be noted that the architectures of the searching devices PAP_j (j ranging from 1 to 4) have been described above considering that none of these devices is configured to verify an alert criterion CRIT_AL_j and emitting, where applicable, an alert message MESS_AL_j including a contact address @UE_j. In order to simplify the description, it will henceforth be considered without any limitation that the contact addresses @UE_j are all identical. This common address is denoted "@UE" hereinafter. It will however be understood that this is only one variant implementation of the invention, and nothing precludes all or part of the addresses @UE_j from differing from one another.

As can be seen from the examples of the FIGS. 2, 3, 4 and 5, the terminal UE is configured, in this embodiment, to interact with each of the searching devices PAP_1, PAP_2, PAP_3 and PAP_4, by implementing a communication method according to the invention.

FIG. 6 schematically represents an example of a hardware architecture of the terminal UE belonging to the sensitive data managing system SYS of FIG. 1.

As illustrated by FIG. 6, the terminal UE possesses the hardware architecture of a computer. Thus, the terminal UE includes, in particular, a processor 1_UE, a random-access memory 2_UE, a read-only memory 3_UE and a non-volatile memory 4_UE. It moreover includes a communicating module 5_UE.

The read-only memory 3_UE of the terminal UE constitutes a recording medium in accordance with the invention, readable by the processor 1_UE and on which is recorded a computer program PROG_UE in accordance with the invention, including instructions for executing steps of a particular mode of implementation of the communication method according to the invention. The program PROG_UE defines functional modules of the terminal UE, which rely on or control the hardware elements 1_UE to 5_UE of the terminal UE mentioned previously, and which in particular comprise in the embodiment described here:

a processing module MOD_CREA_UE configured to set up the tunnels TUN_1 and TUN_2 with the searching devices PAP_1 and PAP_2 respectively, a copying module MOD_REP_UE configured to duplicate at least one data packet intended to be transmitted to a destination equipment item EQUIP_OS, EQUIP_APP_i, an emitting module MOD_TRANSMISSION_UE0 configured to emit at least one original data packet or else a copy of said at least one original data packet, an access module MOD_ACC configured to access items of information about sensitive data detected in said at least one data packet (the items of information in question are those provided by a searching device PAP_j).

In the embodiment described here, the access module MOD_ACC more specifically includes:

a first receiving sub-module SS_MOD1_RX_UE configured to receive an alert message MESS_AL_j (j ranging from 1 to 4) coming from a searching device PAP_j, an emitting sub-module SS_MOD_TRANSMISSION_UE configured to emit, to the contact address @UE, a request to download the software file MEMO_UE_j stored by said searching device PAP_j and transferred to said contact address @UE, a second receiving sub-module SS_MOD2_RX_UE configured to receive (in response to said download request) said software file MEMO_UE_j.

Note that, in this embodiment, the communicating module 5_UE contains the emitting module MOD_TX_UE and also the access module MOD_ACC.

Note also that once it is aware of the existence of the searching devices PAP_1 and PAP_2, the setting-up of said tunnels TUN_1 and TUN_2 responds to techniques known to those skilled in the art, and which will therefore not be further described here.

As regards the awareness of the existence of the searching devices PAP_1 and PAP_2 (but also ultimately the searching devices PAP_3 and PAP_4), this can, for example, be the result of a discovery procedure implemented by the terminal UE (sending of requests, receiving of answers to said requests, etc.) in which case the terminal UE includes hardware and/or software means configured to implement such a discovery procedure. In another example, the awareness of the existence of the searching devices PAP_j is the result of a transmission of items of information from the access provider. In general, no limitation is attached to the way in which the terminal UE acquires awareness of the existence of the searching devices PAP_j.

Following similar considerations, duplicating data packets involves technical procedures known to those skilled in the art, the terminal UE (or the equipment item CPE respectively) being suitably configured (particularly by means of the copying module MOD_REP_UE) to implement such procedures (activation of duplication of data packets, for example).

Finally, it is also noted that, insofar as the sensitive data managing system SYS here includes the searching devices PAP_3 and PAP_4 configured to act as proxies, it is possible to envision, according to non-detailed exemplary embodiments, that a local root certificate is installed on the terminal UE to be able to involve at least one of said searching devices PAP_3, PAP_4 in a secure connection set up for a route followed by data packets to a destination equipment item.

FIG. 7 represents, in the form of a flowchart, a particular embodiment of a data processing method, the so-called "general method", implemented by the sensitive data managing system SYS of FIG. 1.

Said mode of the general method encompasses:

a particular mode of the communication method according to the invention and implemented by the terminal UE, particular modes of the identifying method according to the invention and respectively implemented by the searching devices PAP_1, PAP_2, PAP_3 and PAP_4.

For the description of Ais embodiment of FIG. 7, it is considered that the terminal UE emits a data packet P1_OS. More specifically, said data packet is emitted by the operating system OS of the terminal UE. It is also considered that the data packet P1_OS is copied by the terminal UE, this aspect being described in more detail hereinafter.

It will however be understood that the fact of considering such a single data packet P1_OS does not constitute a limitation of the invention. Indeed, it is possible to envision any number of data packets, but also to envision for any sensitive data to be inserted into these packets by another source than the operating system OS.

Without any limitation, the following series of hypotheses will be considered:

the terminal UE is equipped with the operating system OS along with two applications APP_1, APP_2 (i.e. N=2). Moreover, at the time of subscription to its contract with the access provider, so as to be able to benefit from a sensitive data search service, the user of the terminal UE has defined a filtering list L_FILT listing the sensitive data that it wishes to see identified. In this implementation, said filtering list L_FILT aims for all the sensitive data coming from the operating system OS and from the single application APP_1 to be identified.

Of course this is only one example of a filtering list, no limitation being attached to the sensitive data that can be listed in such a filtering list, the searching module MOD_ID_1 of the searching device PAP_1 is configured so as to allow the identification of sensitive data coming from said operating system OS, the searching module MOD_ID_2 of the searching device PAP_2 is configured so as to allow the identification of sensitive data coming from said operating system OS, and also from the local network NET_LOC and from the access network NET_ACC, the searching module MOD_ID_3 of the searching device PAP_3 is configured so as to allow the identification of sensitive data coming from the application APP_1, the searching module MOD_ID_4 of the searching device PAP_4 is configured so as to allow the identification of sensitive data coming from the operating system OS and also from the applications APP_1 and APP_2.

Thus, according to such hypotheses, the searching devices PAP_2 and PAP_4 are able to identify sensitive data coming from sources which are not included in the filtering list L_FILT parameterized by the user of the terminal UE. More specifically, the dictionary associated with the searching device PAP_2 is of non-empty intersection with the filtering list L_FILT (this intersection corresponding to the only data coming from the operating system OS). The filtering list L_FILT is moreover strictly included in the dictionary associated with the searching device PAP_4.

Hence, two cases may arise in relation to the hypotheses made above:

a first case in which the filtering list L_FILT is communicated (by the access provider or else by the terminal UE) at least to said searching devices PAP_2 and PAP_4, such that these latters conform, if they can, to the contents of said filtering list L_FILT (i.e. the identification of sensitive data is done by comparison with said filtering list L_FILT). In other words, in this first case, the searching device PAP_2 identifies only the sensitive data coming from the operating system OS, not from the local network NET_LOC or from the access network NET_ACC. The searching device PAP_4, meanwhile, identifies only the sensitive data coming from the operating system OS and also from the application APP_1, but not from the application APP_2, a second case in which at least one of said searching devices PAP_2, PAP_4 does not take into account the filtering list L_FILT, for example because the access provider has not communicated it to it. In other words, said at least one searching device PAP_2, PAP_4 identifies all the sensitive data for which its identifying module MOD_ID_2, MOD_ID_4 is parameterized, independently of the contents of the filtering list L_FILT. Such an implementation for example allows the access provider to develop a tiered sales offer. For example, if the searching device PAP_4 is concerned by this second case, the access provider can first of all simply warn the user that the application APP_2 is transmitting sensitive data, without disclosing the nature of said sensitive data (e.g. the nature of the sensitive data is masked in the software file MEMO_UE_4). Full access to said sensitive data transmitted by the application APP_2 can then be conditional on an additional payment by the user (e.g. clause on the contract to which the user of the terminal UE has subscribed).

For the remainder of the description, it is considered without any limitation that each of said searching devices PAP_2, PAP_4 implements a particular mode of the identifying method according to dispositions that conform to the second case mentioned above (i.e. the filtering list L_FILT is not taken into account).

Moreover, it is also considered that software files MEMO_UE_j (j ranging from 1 to 4) are already stored by the searching devices PAP_j, for example in their non-volatile memories 4_j. The existence of these software files MEMO_UE_j is for example the result of one or more prior implementations of the general method. It will hence be understood that if new sensitive data are detected, said software files MEMO_UE_j are updated according to said newly identified sensitive data.

In said mode of implementation, and as illustrated by FIG. 7, the general method includes a step E10_UE of emitting of said data packet P1_OS by the operating system OS of the terminal UE. More specifically, the packet P1_OS is emitted toward the equipment item CPE following a route configured as default at the level of the terminal UE. In other words, the packet P1_OS is intended to be received by the searching devices PAP_3 and PAP_4.

Said step E10_UE is implemented by the emitting module MOD_TRANSMISSION_UE equipping the terminal UE and is an integral part, in said mode, of the communication method executed by said terminal UE.

In said present mode of implementation, the general method also includes a step E20_UE of duplicating of said data packet P1_OS, so as to obtain a copy P1_OS_BIS. Said copy P1_OS_BIS is also emitted by the terminal UE during a step E30_UE, more specifically to the searching devices PAP_1 and PAP_2 via the tunnels TUN_1 and TUN_2 respectively.

Said steps E20_UE and E30_UE are respectively implemented by the copying module MOD_REP_UE and the emitting module MOD_TRANSMISSION_UE equipping said terminal UE and are an integral part, in said mode, of said communication method.

On receiving said data packet P1_OS (steps E40_3, E40_4) along with said copy P1_OS_BIS (steps E40_1 E40_2), each searching device PAP_j implements a step E50_j of verifying of the authentication criterion CRIT_AUTH. Said steps E40_j and E50_j are respectively implemented by the receiving module MOD_RX_j and the verifying module MOD_VERIF_j equipping the searching device PAP_j, and are an integral part, in said mode, of the searching method executed by said searching device PAP_j.

In this mode of implementation, the user of the terminal UE having subscribed to a contract with the access provider, the authorization criterion CRIT_AUTH is satisfied.

Moreover, given the assumptions made about the dictionaries respectively associated with the searching devices PAP_1, PAP_2, PAP_3 and PAP_4, only the devices PAP_1, PAP_2 and PAP_4 are able to identify sensitive data in the packet P1_OS (or P1_OS_BIS where applicable), by comparison with said dictionaries.

The general method then includes, for the searching devices PAP_1, PAP_2, PAP_4, steps E60_1, E60_2, E60_4 of searching for sensitive data in the packet P1_OS (or P1_OS_BIS where applicable). Said steps E60_1, E60_2, E60_4 are implemented by the searching module MOD_ID_1, MOD_ID_2, MOD_ID_4 equipping the searching devices PAP_1, PAP_2, PAP_4 and are an integral part, in said mode, of the searching methods respectively executed by said searching devices PAP_1, PAP_2, PAP_4.

For the rest of the description, it is considered without any limitation that sensitive data inserted by the operating system OS are properly detected by the devices PAP_1, PAP_2 and PAP_4 in the data packets P1_OS, P1_OS_BIS. It is moreover considered that the searching device PAP_2 has not detected, in the copy P1_OS_BIS, any sensitive data inserted by the local network NET_LOC and the access network NET_ACC.

The searching devices PAP_1, PAP_2, PAP_4 then implement steps E70_1, E70_2, E70_4 of storing (updating) items of information representative of the sensitive data detected in the software files MEMO_UE_1, MEMO_UE_2, MEMO_UE_4. Said steps E70_1, E70_2, E70_4 are implemented by the storing sub-modules SS_MOD_MEM_1, SS_MOD_MEM_2, SS_MOD_MEM_4 equipping the searching devices PAP_1, PAP_2, PAP_4 and are an integral part, in said mode, of the searching methods respectively executed by said searching devices PAP_1, PAP_2, PAP_4.

Once the searching and storing are finished, the searching devices PAP_3, PAP_4 implement steps E80_3, E80_4 of transmitting the data packet P1_OS to the destination equipment item EQUIP_OS. Said steps E80_3, E80_4 are implemented by the transmitting modules MOD_TRANSMIS-SION_3, MOD_TRANSMISSION_4 equipping the searching devices PAP_3, PAP_4 and are an integral part, in said mode, of the searching methods respectively executed by said searching devices PAP_3, PAP_4.

It should be noted that the copy P1_OS_BIS is itself not transmitted by the searching devices PAP_1, PAP_2 to the destination equipment item EQUIP_OS. Specifically, and as detailed above, only the searching devices PAP_3, PAP_4 are configured to play a proxy role.

The searching devices PAP_1, PAP_2, PAP_4 also implement steps E90_1, E90_2, E90_4 of verifying alert criteria CRIT_AL_1, CRIT_AL_2, CRIT_AL_4. Said steps E90_1, E90_2, E90_4 are implemented by the verifying sub-modules SS_MOD_VERIF_1, SS_MOD_VERIF_2, SS_MOD_VERIF_4 equipping the searching devices PAP_1, PAP_2, PAP_4 and are an integral part, in said mode, of the identifying methods respectively executed by said searching devices PAP_1, PAP_2, PAP_4.

It is assumed here, without any limitation, that among the exposure thresholds S_EXP_1, S_EXP_2, S_EXP_4 respectively associated with the searching devices PAP_1, PAP_2, PAP_4, only the exposure threshold S_EXP_1 is exceeded. Consequently, only the alert criterion CRIT_AL_1 is satisfied. Note that the fact of having separate exposure thresholds in particular makes it possible to vary the sensitivity of the searching devices as regards sensitive data coming from a same source.

Hence, and as illustrated by FIG. 7, the general method includes a step E110_1 of emitting, by the searching device PAP_1 and to the terminal UE, an alert message MES-S_AL_1 configured to allow access of said terminal UE to the software file MEMO_UE_1. The alert message MES-S_AL_1 includes the contact address @UE to which the software file MEMO_UE_1 is transferred by the searching device PAP_1 (said transfer being done in a step E100_1 implemented by the communication means 51 equipping the searching device PAP_1).

Said step E110_1 is implemented by the emitting sub-module SS_MOD_EMI_1 equipping the searching device PAP_1 and is an integral part, in said mode, of the identifying method executed by said searching device PAP_1.

In this mode of implementation, the general method also includes a step E120_UE of receiving, by the terminal UE, of the alert message MESS_AL_1 emitted by the searching device PAP_1. Said step E120_UE is implemented by the first receiving sub-module SS_MOD1_RX_UE equipping the terminal UE and is an integral part, in said mode, of the communication method executed by said terminal UE.

On receiving the alert message MESS_AL_1, the terminal UE implements a step E130_UE of transmitting, to the contact address @UE, a request REQ_UE_1 to download the software file MEMO_UE_1. Said step E130_UE is implemented by the emitting sub-module SS_MOD_TRANSMISSION_UE equipping the terminal UE and is an integral part, in said mode, of the communication method executed by said terminal UE.

Finally, the general method also includes, in said mode of implementation, a step E140_UE of receiving, by the terminal UE and in response to said request REQ_UE_1, of the software file MEMO_UE_1. Said step E140_UE is implemented by the second receiving sub-module SS_MOD2_RX_UE equipping the terminal UE and is an integral part, in said mode, of the communication method executed by said terminal UE.

Once the software file MEMO_UE_1 is downloaded, the user of the terminal UE can view it, for example using display means (e.g. a screen) equipping the terminal UE, so as to gain awareness of the contents of said software file MEMO_UE_1.

The invention has until now been described considering modes of implementation of the searching method in which each searching device PAP_j is configured to store sensitive data in a software file MEMO_UE_j which it alone can possess (before any sharing with the terminal UE). The invention is nonetheless not limited to these modes, and it is also possible to envision other modes in which, once sensitive data have been detected by one or more searching devices PAP_j, these sensitive data are transmitted to a data processing device, the so-called "aggregating device" PAP_AG (not shown in FIG. 1), belonging to the sensitive data managing system SYS and configured to store them in a globalized software file.

Such a globalized software file can be seen as the compilation of all the software files that would otherwise be generated if the invention was implemented in accordance with the modes described until now. The fact of using such an aggregating device PAP_AG as well as a globalized software file proves particularly advantageous in the event of the terminal UE being connected to a plurality of networks via a plurality of interfaces. Specifically, in this way, the user of said terminal UE can have access, via a single software file (i.e. said globalized software file), to its global digital identity, i.e. its digital identity as constructed through the different networks to which the terminal UE can connect. It will in particular be understood that in cases where sensitive data transmitted via separate interfaces do not make it possible, when considered in isolation, to have access to items of identification information, there is nonetheless a risk that these latters might be obtained from a correlation of the data thus collected over several interfaces.

Note that the aggregating device PAP_AG can be located in any network used by the sensitive data managing system SYS (local network NET_LOC, access network NET_ACC, global network NET_GLOB), or else in another network.

FIG. 8 schematically represents an example of a hardware architecture of the aggregating device PAP_AG belonging to the sensitive data managing system SYS according to an embodiment of the invention.

As illustrated in FIG. 8, the aggregating device PAP_AG has the hardware architecture of a computer. Thus, the aggregating device PAP_AG includes, in particular, a processor 1_AG, a random access memory 2_AG, a read-only memory 3_AG and a non-volatile memory 4_AG.

It further includes a communicating module 5_AG.

The read-only memory 3_AG of the aggregating device PAP_AG constitutes a recording medium in accordance with the invention, readable by the processor 1_AG and on which is recorded a computer program PROG_AG in accordance with the invention, including instructions for executing steps of a particular mode of implementation of the identifying method according to the invention. The program PROG_AG defines functional modules of the aggregating device PAP_AG, which rely on or control the hardware components 1_AG to 5_AG of the aggregating device PAP_AG mentioned previously, and which in particular comprise, in the embodiment described here:

a receiving module MOD_RX_AG configured to receive, from the searching devices PAP_j (j ranging from 1 to 4), sensitive data detected by said searching devices PAP_j (note that in this case, each of said searching devices is equipped with a transmitting module, configured to transmit the sensitive data identified to the aggregating device PAP_AG), a providing module MOD_DISP_AG configured to provide the user of the terminal UE with items of information about the sensitive data detected.

Said providing module MOD_DISP_AG more specifically includes, in the embodiment described here:

a storing sub-module SS_MOD_MEM_AG configured to store, in a software file MEMO_UE_AG associated with said terminal UE, items of information representative of the sensitive data transmitted by said searching devices PAP_j, a verifying sub-module SS_MOD_VERIF_AG configured to verify whether or not an alert criterion CRIT_AL_AG is satisfied, an emitting sub-module SS_MOD_EMI_AG configured to emit, if the alert criterion CRIT_AL_AG is satisfied, an alert message MESS_AL_AG to the terminal UE, said alert message MESS_AL_AG being configured to allow the access of said terminal UE to said software file MEMO_UE_AG.

It has also been considered until now that the search for sensitive data done by a searching device PAP_j is based on a previously established dictionary associated with said searching device PAP_j and which is not intended to be enriched gradually as the data packets are received by said searching device PAP_j. Such a data search can therefore be seen as a static process.

The invention is not however limited to such a static process, and it is in particular possible to envision modes in which the data packets received by a searching device PAP_j are used to enrich (complete) its dictionary. Such modes therefore allow, unlike the static process described above, the implementation of an identification of data representative of a dynamic process.

For example the searching module MOD_ID_j equipping a searching device PAP_j can be configured to execute an automatic learning algorithm, such that this algorithm can detect recurring data patterns (identifier(s), number(s), address(es), etc.) contained in the data packets received by said searching device PAP_j. This learning algorithm for example corresponds to an algorithm from the field of artificial intelligence in particular based on machine learning techniques and configured to perform a semantic analysis of the data packets received. In general, any automatic learning algorithm known to those skilled in the art can be implemented. The learning algorithm can moreover be configured to maintain the persistence time of the detected recurring identifiers (1 day, 1 week, permanent), associate a type with such identifiers, etc.

Note also that it is possible to envision that a searching device PAP_j recognizes recurring data patterns without however having awareness of the structure of the data packets that it receives.

Moreover, when a searching device PAP_j detects a recurring data pattern corresponding to an address (for example an IP address and/or SNI (Server Name Identification), and this address is not yet listed in its dictionary, it can then begin a procedure with the aim of resolving the identity of the entity associated with this address. Such a procedure is known per se, and consists for example in emitting one or more queries to a database (e.g. WHOIS database).

It will be clearly apparent to those skilled in the art that the preceding provisions relating to the possibility of dynamically enriching a dictionary can of course apply to the aggregating device PAP_AG.

Another important aspect to be noted is that, within the meaning of the invention, the entity whose items of identification information are determined, via detected sensitive data, is not limited to the user of a terminal alone. Specifically, and as already mentioned above, nothing precludes the considering of embodiments of the invention in which several terminals are active (i.e. the searching device or devices being then able to identify sensitive data in packets emitted by this plurality of terminals). In this case, the entity in question can for example be an entity in charge of the management of said plurality of terminals.

To illustrate this, one may consider, without any limitation, the case of a parent having purchased a smartphone for each of his children. Hence, the user of a smartphone is one of the children to which said smartphone is assigned, said parent constituting the entity in charge of the management of all said smartphones (the digital identities determined, optionally, for each of the children being then able to be aggregated to form a representative digital identity associated with said parent).

It can also be noted that in the embodiment of FIG. 1, the terminal UE "belongs" (directly) to the local network NET_LOC, or else "belongs" (indirectly) to the access network NET_ACC. Consequently, it is possible to consider, within the meaning of this invention, an alternative in which the entity whose items of identification information are determined, via detected sensitive data, is the local network NET_LOC or else the access network NET_ACC. Moreover, in the case of embodiments in which several terminals are active, it is possible to define, where applicable, the digital identity of the local network NET_LOC (or of the access network NET_ACC respectively) as an aggregate of the respective digital identities of the terminals belonging to said local network NET_LOC (or to said access network NET_ACC respectively).

The invention claimed is:
1. A method comprising:
searching for sensitive data in at least one data packet emitted by at least one terminal connected to a network, said at least one data packet having as destination a destination equipment item accessible via said network, the sensitive data having been inserted into said at least one packet before the at least one packet reaches the destination equipment item, wherein:
the sensitive data comprises data enabling items of identification information relating to an identity and/or environment of an entity to which said at least one terminal belongs to be determined from the sensitive data,
the searching is implemented by a searching device separate from said destination equipment item and separate from said at least one terminal,
the searching device is located on a route for routing said at least one data packet to said destination equipment item or is connected to said at least one terminal using at least one tunnel, and
the searching comprises:
receiving said at least one data packet;
searching for sensitive data in said at least one data packet; and
in response to sensitive data being detected in said at least one packet, providing said entity with items of information about said detected sensitive data.
2. The method as claimed in claim 1, wherein the searching device is located on a route for routing said at least one data packet to said destination equipment item, said method further including a transmitting step implemented by said searching device and comprising, once the search for sensitive data has been carried out, relaying said at least one data packet to the destination equipment item.
3. The method as claimed in claim 1, wherein said searching device is connected to the at least one terminal using at least one tunnel, said at least one data packet received by the searching device being a copy of an original data packet transmitted to the destination equipment item, said copy being transmitted via said at least one tunnel and not being relayed by said searching device to the destination equipment item.
4. The method as claimed in claim 1, wherein the searching step includes:
comparing data contained in said at least one packet with a filtering list associated with said at least one terminal, and/or
comparing the data contained in said at least one packet with a dictionary associated with said searching device, and/or
executing an automatic learning algorithm to detect recurring data patterns contained in said at least one data packet.
5. The method as claimed in claim 1, wherein the providing step includes, in response to an alert criterion being satisfied, emitting an alert message configured to allow access of the entity to said items of information about the detected sensitive data.
6. The method as claimed in claim 1, wherein sensitive data are inserted into said at least one packet by at least any one of the components from among:
an operating system equipping said at least one terminal,
a software application installed on said at least one terminal,
an access network to which said at least one terminal is connected, and connected to the network via which said destination equipment item is accessible,
a local network to which said at least one terminal is connected, and connected to said access network.
7. The method as claimed in claim 1, wherein the sensitive data comprises a sensitive datum selected from a group consisting of:
a datum of location of said at least one terminal,
an International Mobile Subscriber Identity (IMSI) or a Mobile Station International Subscriber Directory Number (MSISDN) or an International Mobile Equipment Identity (IMEI) number associated with said at least one terminal, a Subscriber Identity Module (SIM) card number equipping said at least one terminal, at least one of an identifier of an access network connected to the network via which said destination equipment item is accessible or an identifier of an operator in charge of managing said access network, at least one of an identifier of said local network to which the at least one terminal is connected or a persistent identifier of a destination equipment item making a connection between the local network and an access network connected to the network via which the destination equipment item is accessible, an Internet Protocol (IP) address or a hardware address of said at least one terminal, an IP address or a hardware address of at least one other terminal positioned in a neighborhood of said at least one terminal having emitted said at least one packet, and a persistent identifier associated with said at least one terminal.

8. The method as claimed in claim 1, wherein said entity is any of the items from among:

a user or an administrator of said at least one terminal, an access network to which said at least one terminal is connected or a local network to which said at least one terminal is connected.

9. The method as claimed in claim 1, wherein the searching step is implemented in response to a criterion of authorization to search for sensitive data for said at least one terminal being satisfied.

10. A searching device comprising:

at least one processor; and at least one non-transitory computer readable medium comprising instructions stored thereon which when executed by the at least one processor configure the searching device to search for sensitive data in at least one data packet emitted by at least one terminal connected to a network, said at least one data packet having as destination a destination equipment item accessible via said network, the sensitive data having been inserted into said at least one packet before the at least one packet reaches the destination equipment item, wherein:

the sensitive data comprises data enabling items of identification information relating to an identity and/or environment of an entity to which said at least one terminal belongs to be determined from the sensitive data, the searching device is separate from said destination equipment item and separate from said at least one terminal, the searching device is configured to be located on a route for routing said at least one data packet to said destination equipment item or connected to said at least one terminal using at least one tunnel, and the search comprises:

receiving said at least one data packet, detecting sensitive data inserted into said at least one data packet, providing said entity, in response to said sensitive data being detected in said at least one packet, with items of information about said detected sensitive data.

11. The searching device as claimed in claim 10, said searching device being deployed in:

the network via which said destination equipment item is accessible, an access network connected to the network via which said destination equipment item is accessible, or a local network to which said at least one terminal is connected, the local network being connected to an access network, which is connected to the network via which said destination equipment item is accessible.

12. A sensitive data managing system including:

the searching device as claimed in claim 10; and the at least one terminal, each of the at least one terminal comprising:

at least one processor; and at least one non-transitory computer readable medium comprising instructions stored thereon which when executed by the at least one processor of the terminal configure the terminal to:

emit the at least one data packet in the network, access the items of information about sensitive data detected in said at least one data packet.

13. An aggregating device including:

at least one processor; and at least one non-transitory computer readable medium comprising instructions stored thereon which when executed by the at least one processor configure the aggregating device to:

receive, coming from a plurality of searching devices, sensitive data detected by said searching devices in at least one data packet emitted by at least one terminal connected to a network, said at least one data packet having as destination a destination equipment item accessible via said network, and the sensitive data having been inserted into said at least one packet before the at least one packet reaches the destination equipment item, wherein:

the sensitive data comprising data enabling items of identification information relating to an identity and/or environment of an entity to which said at least one terminal belongs to be determined from the sensitive, the plurality of searching devices are separate from said destination equipment item and separate from said at least one terminal, and the plurality of searching devices are located on a route for routing said at least one data packet to said destination equipment item or connected to said at least one terminal by a tunnel; and provide said entity with items of information about the sensitive data received from said plurality of searching devices.

14. A communication terminal including:

at least one processor; and at least one non-transitory computer readable medium comprising instructions stored thereon which when executed by the at least one processor configure the communication terminal to:

emit at least one data packet in a network, said at least one data packet having as destination a destination equipment item accessible via said network, duplicate the at least one data packet and transmit said duplicate at least one data packet to at least one searching device, wherein:

said at least one searching device is separate from said destination equipment item and separate from said communication terminal, said at least one searching device is located on a route for routing said duplicate at least one data packet to said destination equipment item or connected to said communication terminal by a tunnel, access items of information about sensitive data inserted before the at least one data packet reaches said destination equipment item and detected in said duplicate at least one data packet by the at least one searching device, wherein:

the items of information comprise items of identification information relating to an identity and/or environment of an entity to which said communication terminal belongs, and the sensitive data comprises data enabling the items of identification information to be determined from the sensitive data.

\* \* \* \* \*